United States Patent
Choi

(10) Patent No.: US 9,465,569 B2
(45) Date of Patent: Oct. 11, 2016

(54) CLOUD PRINT METHOD USING AUTOMATIC RESPONSE SYSTEM AND CLOUD PRINT SYSTEM FOR PERFORMING THE SAME

(71) Applicant: Samsung Electronics Co., Ltd., Suwon-si (KR)

(72) Inventor: Chang-seok Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/703,254

(22) Filed: May 4, 2015

(65) Prior Publication Data

US 2015/0355873 A1 Dec. 10, 2015

(30) Foreign Application Priority Data

Jun. 5, 2014 (KR) .................. 10-2014-0068578

(51) Int. Cl.
*G06F 3/12* (2006.01)

(52) U.S. Cl.
CPC ........... *G06F 3/1268* (2013.01); *G06F 3/1204* (2013.01); *G06F 3/126* (2013.01); *G06F 3/1292* (2013.01)

(58) Field of Classification Search
CPC .... G06F 3/1268; G06F 3/126; G06F 3/1292; G06F 3/1204
USPC ........................................................ 358/1.15
See application file for complete search history.

(56) References Cited

U.S. PATENT DOCUMENTS

| | | | |
|---|---|---|---|
| 2005/0111031 A1* | 5/2005 | Scott | G06Q 20/206 358/1.15 |
| 2009/0033985 A1 | 2/2009 | Platov | |
| 2009/0161842 A1* | 6/2009 | Sylvain | H04M 3/493 379/93.05 |

FOREIGN PATENT DOCUMENTS

| | | |
|---|---|---|
| EP | 1691270 | 8/2006 |
| WO | 2013/095498 | 6/2013 |

OTHER PUBLICATIONS

Extended European Search Report dated Nov. 19, 2015 in European Patent Application No. 15169976.6.

* cited by examiner

*Primary Examiner* — Eric A Rust
(74) *Attorney, Agent, or Firm* — Staas & Halsey LLP

(57) ABSTRACT

Provided is a cloud print method using an automatic response system, the cloud print method including: receiving a call, by the automatic response system, from a user terminal; providing the user terminal, by the automatic response system, with an automatic response voice guidance message regarding a printable document via the automatic response system; selecting, by the automatic response system, a document to be printed via the user terminal; identifying, by the automatic response system, a destination phone number to which the selected document is to be transmitted; transmitting, by the automatic response system, the selected document and destination phone number from the automatic response system to a cloud print server; and transmitting, by the cloud printer server, the selected document from the cloud print server to an image forming apparatus corresponding to the destination phone number.

19 Claims, 20 Drawing Sheets

INPUT PIN

IDENTIFY WHETHER PHONE NUMBER OF AUTOMATIC RESPONSE
SYSTEM IS INCLUDED IN TRANSMISSION PERMISSION LIST

CLOUD PRINT METHOD USING AUTOMATIC RESPONSE SYSTEM AND CLOUD PRINT SYSTEM FOR PERFORMING THE SAME

CROSS-REFERENCE TO RELATED APPLICATIONS

This application claims the priority benefit of Korean Patent Application No. 10-2014-0068578, filed on Jun. 5, 2014, in the Korean Intellectual Property Office, the disclosure of which is incorporated herein in its entirety by reference.

BACKGROUND

1. Field

One or more exemplary embodiments relate to a cloud printing method using an automatic response system, and more particularly, to a cloud printing method of transmitting a selected document to an image forming apparatus corresponding to an arbitrarily selected destination phone number via an automatic response system and of printing the transmitted document.

2. Description of the Related Art

A cloud print service is provided based on cloud computing and a series of printing operations are performed on the Internet. The cloud print service is relatively less affected by a user environment, and according to the frequency of using the cloud print service, materials for printing can be flexibly determined. As a result, the demand for cloud print services has increased.

A cloud print system generally includes a cloud print server configured to transmit/receive and store print data, render the print data, and the like. The cloud print server renders the print data received from various devices via a network and immediately transmits the rendered print data to a designated printer or transmits stored data to a printer upon receipt of a user request.

An automatic response system has been used by private companies, public agencies, etc. in order to increase the efficiency and user convenience of the public. For example, a printable document is provided to a user according to an automatic response voice signal, and when the user selects the printable document, the automatic response system may transmit the selected document by email or fax to the user.

SUMMARY

One or more exemplary embodiments include a cloud print method of printing a selected document by an image forming apparatus corresponding to a destination phone number, via an automatic response system.

According to one or more exemplary embodiments, a cloud print method using an automatic response system, includes: receiving a call, by the automatic response system, from a user terminal; providing the user terminal, by the automatic response system, with an automatic response voice guidance message regarding a plurality of documents by the automatic response system; selecting, by the automatic response system, a document to be printed from the plurality of documents by using the user terminal; identifying, by the automatic response system, a destination phone number to which the selected document is to be transmitted; transmitting, by the automatic response system, the selected document and destination phone number from the automatic response system to a cloud print server; and transmitting, by the cloud printer server, the selected document from the cloud print server to an image forming apparatus corresponding to the destination phone number.

The transmitting of the selected document to the image forming apparatus may include: determining if transmission of the selected document to the destination phone number is permitted; identifying the image forming apparatus that is registered in the cloud print server and corresponds to the destination phone number when the transmission is permitted; and transmitting the selected document to the identified image forming apparatus.

The automatic response system may receive a personal identification number (PIN) from the user terminal and may transmit the received PIN together with the selected document and destination phone number to the cloud print server. The determining may include determining that the transmission is permitted if the PIN received from the user terminal is consistent with a PIN stored in the cloud print server.

The determining may include: identifying a phone number of the automatic response system via the cloud print server; and determining that the transmission is permitted if the phone number of the automatic response system is included in a transmission permission list stored in the cloud print server.

When a request is received from the user terminal, the phone number of the automatic response system may be registered to the transmission permission list.

The transmitting of the selected document to the image forming apparatus may include: storing, by the cloud print server, the transmitted document which is associated with the destination phone number; receiving, by the cloud print server, from the user terminal, a request for printing the stored document corresponding to the destination phone number; and transmitting, by cloud print server, the stored document to the image forming apparatus corresponding to the destination phone number.

The identifying of the destination phone number may be performed by determining a phone number of the user terminal as a destination phone number.

The identifying of the destination phone number may include: transmitting a request for inputting the destination phone number to the user terminal; and receiving the destination phone number input to the user terminal.

According to one or more exemplary embodiments, a system for performing a cloud print method, includes: a cloud print server in which an image forming apparatus corresponding to at least one phone number is registered; and an automatic response system configured to provide a voice guidance message regarding a plurality of documents when a call from a user terminal is received and configured to transmit, to the cloud print server, both a document selected from the plurality of documents by using the user terminal and a destination phone number. The cloud print server may be configured to transmit the selected document to the image forming apparatus corresponding to the destination phone number received from the automatic response system.

The cloud print server may include: a communication unit configured to transmit/receive data to/from the automatic response system and the image forming apparatus; a transmission determination unit configured to determine whether transmission of the document received from the automatic response system is permitted; a storage unit in which the image forming apparatus corresponding to the destination phone number is registered; a rendering unit configured to perform rendering regarding the received document; and a controller. When the transmission of the received document is permitted after the determination is made by the transmission determination unit, the controller may be configured to check the storage unit to identify the image forming apparatus corresponding to the destination phone number and to transmit the received document to the identified image forming apparatus through the communication unit.

The automatic response system may be further configured to receive a PIN input by the user terminal and transmit, to the cloud print server, the input PIN together with the selected document and the destination phone number, and the transmission determination unit may be configured to determine that the transmission is permitted if the PIN input by the user terminal is consistent with a PIN stored in the storage unit.

The transmission permission unit may be configured to identify a phone number of the automatic response system and determine that the transmission is permitted if the identified phone number is included in a transmission permission list stored in the storage unit.

When a request is received from the user terminal, the phone number of the automatic response system may be registered to the transmission permission list.

The cloud print server may be further configured to store the received document to correspond to the destination phone number and transmit the document stored in the image forming apparatus corresponding to the destination phone number when a request for printing a document corresponding to the destination phone number is received from the user terminal.

The automatic response system may include: an exchanger configured to connect the call from the user terminal to a component included in the automatic response system; an interactive voice response (IVR) server configured to provide the voice guidance message regarding the document and receive an input for selecting the document from the user terminal when the call is connected to the user terminal via the exchanger; a destination identification unit configured to identify the destination phone number to which the selected document is to be transmitted; and a cloud interworking server configured to transmit the selected document and the identified destination phone number to the cloud print server.

The destination identification unit may be configured to determine the phone number of the user terminal as a destination phone number.

The destination identification unit may be configured to transmit a request for inputting the destination phone number to the user terminal and receive the destination phone number input by the user terminal.

The selected document received by the cloud print server may be rendered by the cloud print server and the rendered selected document may be transmitted to the image forming apparatus.

According to one or more exemplary embodiments, a system for performing a cloud print method includes a cloud print server configured to transmit a selected document to an image forming apparatus corresponding to a destination phone number; and an automatic response system configured to receive a call from a user terminal, configured to provide a voice guidance message regarding a plurality of documents after the received call, and configured to transmit, to the cloud print server, both the document selected from the user terminal from the plurality of documents and the destination phone number.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
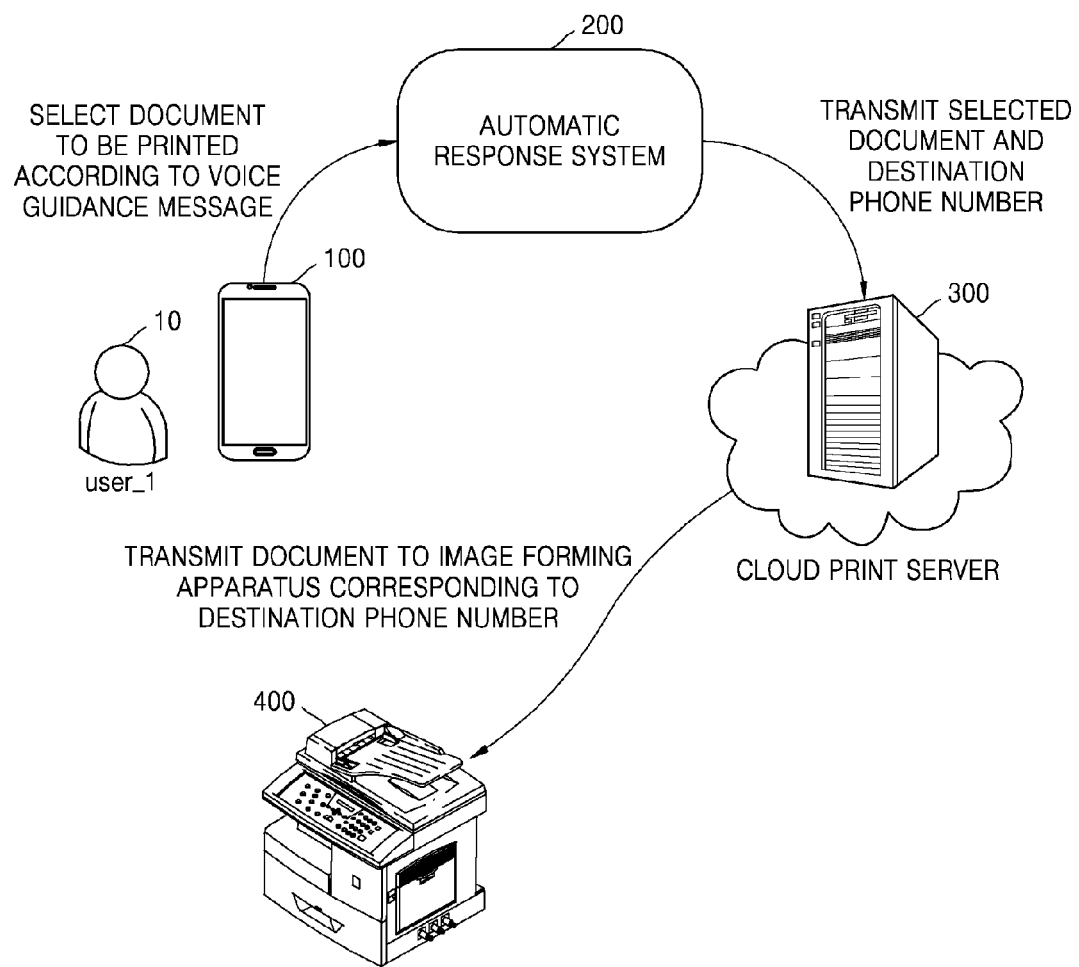
FIG. 1 illustrates an environment in which a cloud print method using an automatic response system is performed according to an embodiment.

FIG. 1 illustrates an environment in which a cloud print method using an automatic response system 200 is performed, according to an embodiment.

FIG. 1 illustrates a user terminal 100, the automatic response system 200, a cloud print server 300, and an image forming apparatus 400, which are configured to perform the cloud print method using the automatic response system 200.

When a user 10 calls the automatic response system 200 via the user terminal 100, the automatic response system 200 provides a previously recorded voice guidance message to the user terminal 100. The user 10 may select a desired menu by pressing a button on the user terminal 100 in accordance with the voice guidance message.

In detail, the automatic response system 200 may provide the user terminal 100 with a voice guidance message regarding a printable document, and the user 10 may select a document as desired via a button input. For example, if the automatic response system 200 is used by a credit card company, the user 10 may select a document provided by the credit card company, for example, a card statement or a statement on discount details, by pressing a button according to the voice guidance message. Alternatively, when the automatic response system 200 is used by public agencies, the user may select a variety of public documents or evidentiary documents.

In this case, the document here denotes a document including texts as well as all types of printable pieces of content including at least one of texts, signs, and images.

The documents may be stored in a database server included in the automatic response system 200 or in an external server interworking with the automatic response system 200. Alternatively, the documents may be stored in places accessible by the automatic response system 200 in various manners.

When the user 10 has selected a printable document according to the voice guidance message, the automatic response system 200 identifies a destination phone number to which the selected document is transmitted and then transmits the selected document and the phone number to the cloud print server 300. In this case, a method via which the automatic response system 200 identifies the destination phone number may be performed by determining a phone number of the user terminal 100 as a destination phone number, receiving a destination phone number input by the user via the user terminal 100, or the like.

An image forming apparatus corresponding to the destination phone number is registered to the cloud print server 300 in advance. That is, a table in which the image forming apparatus is registered to correspond to at least one phone number may be stored in the cloud print server 300. When a transmission request for print data, to be transmitted to a destination phone number is received, the cloud print server 300 identifies an image forming apparatus corresponding to the destination phone number from the table and transmit the print data to the identified image forming apparatus. That is, the cloud print server 300 determines an image forming apparatus to which print data is to be transmitted, based on a received destination phone number.

According to an embodiment, when a selected document and destination phone number is received from the automatic response system 200, the cloud print server 300 identifies the image forming apparatus 400 corresponding to the received destination phone number and transmits the received document to the identified image forming apparatus 400.

The cloud print server 300 determines whether the transmission of the received document is permitted and may transmit the document to the image forming apparatus 400 only when the transmission is permitted. In this case, a determination as to whether the transmission of the document is permitted may be made by various methods. For example, the determination may be made by performing authentication using a personal identification number (PIN) input by the user 10, checking whether a phone number of the automatic response system 200 is included in a transmission permission list of the cloud print server 300, or the like.

The cloud print server 300 stores the received document therein and then may support a pull printing method of transmitting a document to the image forming apparatus 400 corresponding to the destination phone number when a user request is received.

The cloud print server 300 renders the document received from the automatic response system 200 and may transmit the rendered document to the image forming apparatus 400.

The image forming apparatus 400 prints the document received from the cloud print server 300.

As the user 10 selects the document to be printed according to the voice guidance of the automatic response system 200, the user 10 may easily print the document from the image forming apparatus 400.

Figure 2:
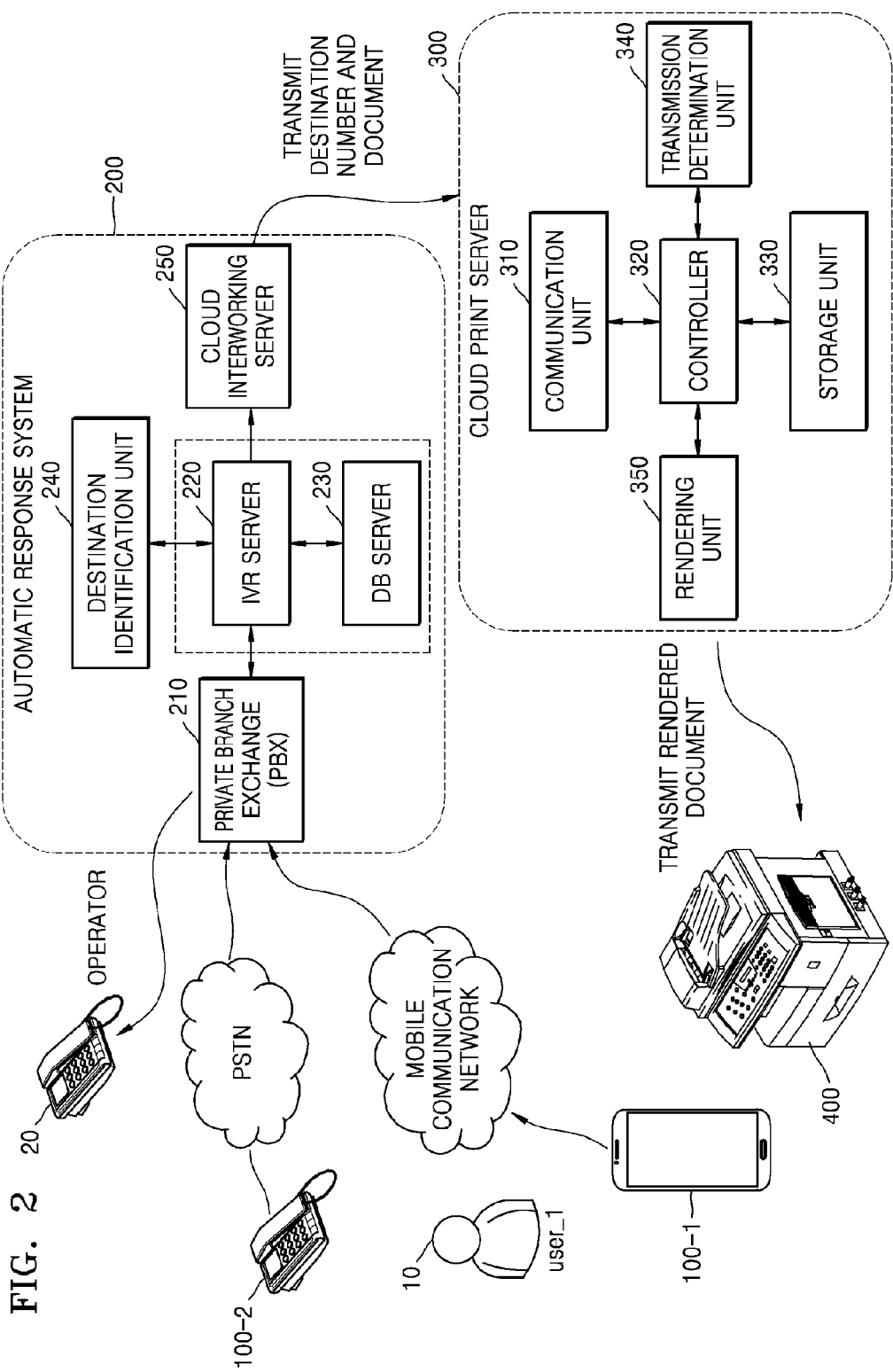
FIG. 2 illustrates a detailed structure of a cloud print system using an automatic response system according to an embodiment.

FIG. 2 illustrates a detailed structure of a cloud print system using the automatic response system 200 according to an embodiment.

Referring to FIG. 2, the automatic response system 200 according to an embodiment may include a private branch exchange (PBX) 210, an interactive voice response (IVR) 220, a database (DB) server 230, a destination identification unit 240, and a cloud interworking server 250. Also, components of the automatic response system 200 are not limited thereto, and the automatic response system 200 may further include other components.

The user 10 may call the automatic response system 200 by using various user terminals such as a mobile terminal 100-1 and an ordinary phone 100-2. Examples of a mobile terminal 100-1 include a phone, a tablet, a laptop, and wearable devices including smart phones and glasses. However, a user terminal 100 is not limited to these devices. When the user calls the automatic response system 200 by using the mobile terminal 100-1, the mobile terminal 100-1 is connected to the PBX 210 of the automatic response system 200 via a mobile communication network. When the user calls the automatic response system 200 by using the ordinary phone 100-2, the ordinary phone 100-2 is connected to the PBX 210 of the automatic response system 200 via a public switched telephone network (PSTN). When a call is received from a user terminal, the PBX 210 of the automatic response system 200 connects the user terminal to the IVR server 220.

The IVR server 220 provides the user terminal with a previously stored voice guidance message and performs an operation corresponding to an input received from the user terminal or provides a voice guidance message corresponding to the input. For example, a voice guidance message regarding numbers respectively corresponding to menus selectable by the user is provided, and when a certain number is selected in the user terminal, a menu corresponding to the selected number is selected, and a voice guidance message corresponding to the selected menu or an operation corresponding thereto is provided.

Also, when a request is received from the user 10, the IVR server 220 may provide a call from the operator 20 instead of previously recorded voice guidance. When the user 10 selects a connection to the operator 20 on the user terminal 100-1, the IVR server 220 connects the operator 20, who is on standby, to the user terminal 100-1 via the PBX 210.

Voice data may be stored for an automatic response and various printable documents may be stored in the DB server 230. In addition, various pieces of data necessary to operate the automatic response system 200 may be stored in the DB server 230.

The destination identification unit 240 identifies a destination phone number to which the selected document is to be transmitted. For example, the destination identification unit 240 may determine a phone number of the user terminal 100-1 as a destination phone number or may request the user terminal 100-1 to input the destination phone number.

The cloud interworking server 250 transmits the selected document and destination phone number to the cloud print server 300. Also, the cloud interworking server 250 may transmit a PIN which is additionally input by the user 10 to the cloud print server 300.

Referring to FIG. 2, the cloud print server 300 according to an embodiment may include a communication unit (communicator) 310, a controller 320, a storage unit (storage) 330, a transmission determination unit (transmission determiner) 340, and a rendering unit (renderer) 350.

The communication unit 310 receives the destination phone number and selected document from the automatic response system 200.

The controller 320 identifies an image forming apparatus corresponding to the received destination phone number. In this case, the controller 320 may identify an image forming apparatus corresponding to the destination phone number from a table stored in the storage unit 330.

A table where the image forming apparatus is registered to correspond to at least one phone number may be stored in the storage unit 330, and a PIN for determining whether transmission of a document is permitted or a transmission permission list may be stored storage unit 330. In this case, the transmission permission list is a list to which a transmittable phone number of an automatic response system is registered.

The transmission determination unit 340 determines whether transmission of documents is permitted. The determination as to whether the transmission of documents is permitted is made by various methods, and in an embodiment, a method of using a PIN or a transmission permission list will be described.

According to the method of using the PIN, when the PIN input by the user 10 is received from the automatic response system 200, the transmission determination unit 340 determines whether the received PIN is consistent with a PIN stored in the storage unit 330. If the received PIN is consistent with the stored PIN, it is determined that the transmission is permitted, and a document received from the automatic response system 200 is transmitted to the image forming apparatus 400 corresponding to the destination phone number. However, if the received PIN is inconsistent with the stored PIN, it is determined that the transmission is not permitted.

According to the method of using the transmission permission list, the transmission determination unit 340 identifies a phone number of the automatic response system 200 and determines whether the identified phone number is included in the transmission permission list.

If the phone number of the automatic response system 200 is included in the transmission permission list, it is determined that the transmission is permitted, and a document received from the automatic response system 200 is transmitted to the image forming apparatus 400 corresponding to the destination phone number. However, if the phone number of the automatic response system 200 is not included in the transmission permission list, it is determined that the transmission is not permitted.

The rendering unit 350 renders the document received from the automatic response system 200. In this case, as an example, the rendering unit 350 may not perform rendering in an automatic response system 200. Instead, in this example, the rendering unit 350 may perform rendering in the cloud print server 300. However, other examples are contemplated.

After the rendering for the document is performed and it is determined that the transmission of a document is permitted, the controller 320 transmits the rendered document to the image forming apparatus 400 corresponding to the destination phone number through the communication unit 310. Alternatively, the controller 320 may immediately transmit the received document to the image forming apparatus 400 through the communication unit 310 without determining whether the transmission of the document is permitted, or the controller 320 stores the received document in the storage unit 330 first and then may transmit the stored document to the image forming apparatus 400 when a request for printing the stored document is received from the user 10 at a later time.

Cloud print methods using the automatic response system 200 according to embodiments will be described in detail with reference to FIGS. 3 through 10.

Figure 3:
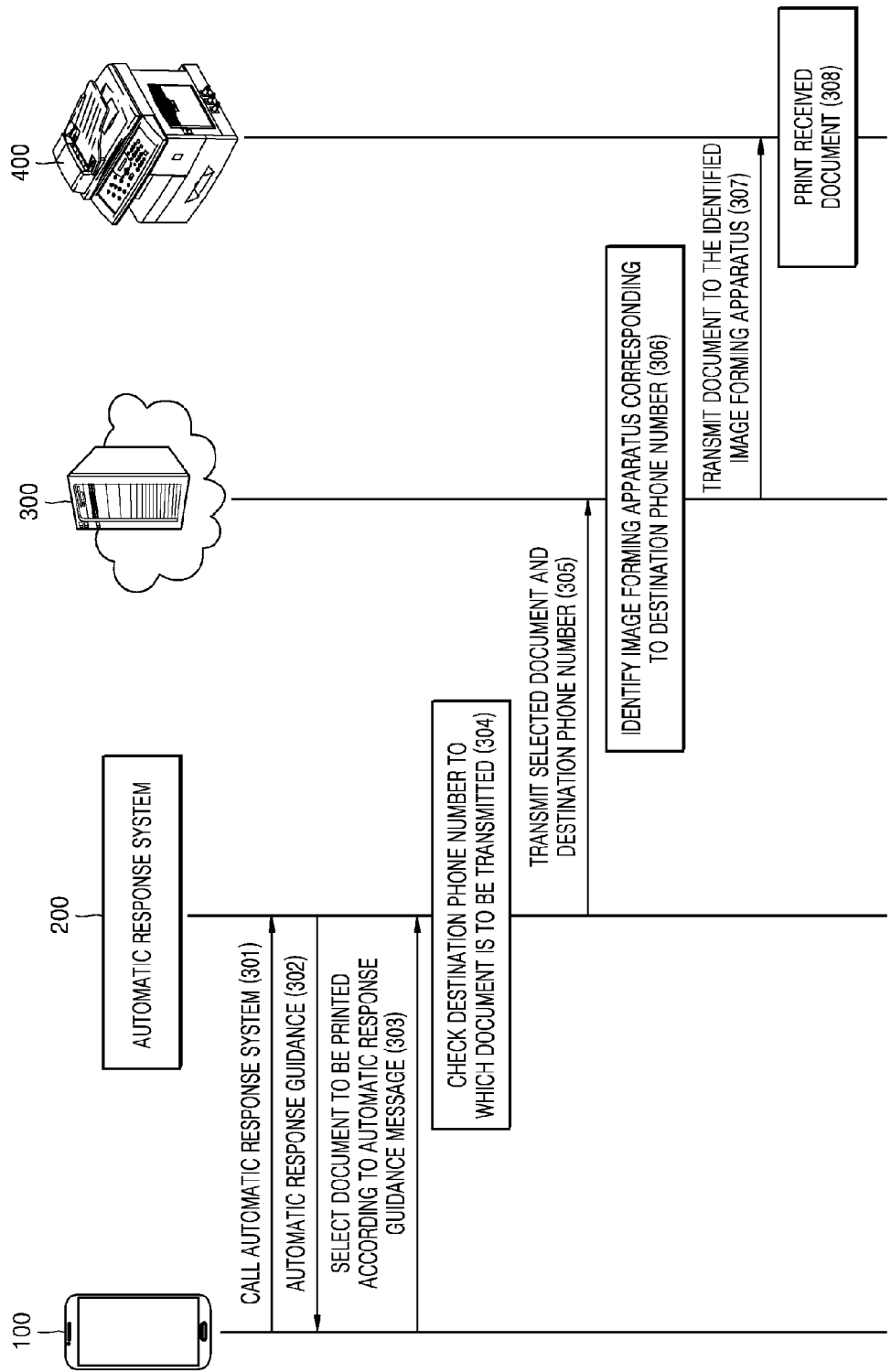
FIGS. 3 through 10 illustrate cloud print methods using an automatic response system according to embodiments.

FIG. 3 illustrates an embodiment.

Referring to FIG. 3, the user terminal 100 calls to the automatic response system 200 in operation 301, and the automatic response system 200 provides automatic response guidance to the user terminal 100 in response to the call in operation 302. In operation 303, the user selects a document to be printed according to the automatic response guidance message, and the user terminal 100 transmits a selection result to the automatic response system 200.

The automatic response system 200 identifies a destination phone number to which the selected document is to be transmitted in operation 304, and transmits the selected document and destination phone number to the cloud print server 300 in operation 305. In this case, a phone number of the user terminal 100 may be determined as a destination phone number, or another destination phone number may be separately input via the user terminal 100.

The cloud print server 300 identifies an image forming apparatus corresponding to the received destination phone number in operation 306. The image forming apparatus corresponding to the received destination phone number is registered to the cloud print server 300 in advance. That is, a table to which an image forming apparatus corresponding to at least one destination phone number may be stored in the cloud print server 300 in advance, and the image forming apparatus corresponding to the received destination phone number may be identified by using the table.

When the cloud print server 300 transmits the document, which is received from the automatic response system 200, to the image forming apparatus 400 in operation 307, the image forming apparatus 400 prints the received document in operation 308.

Figure 4:
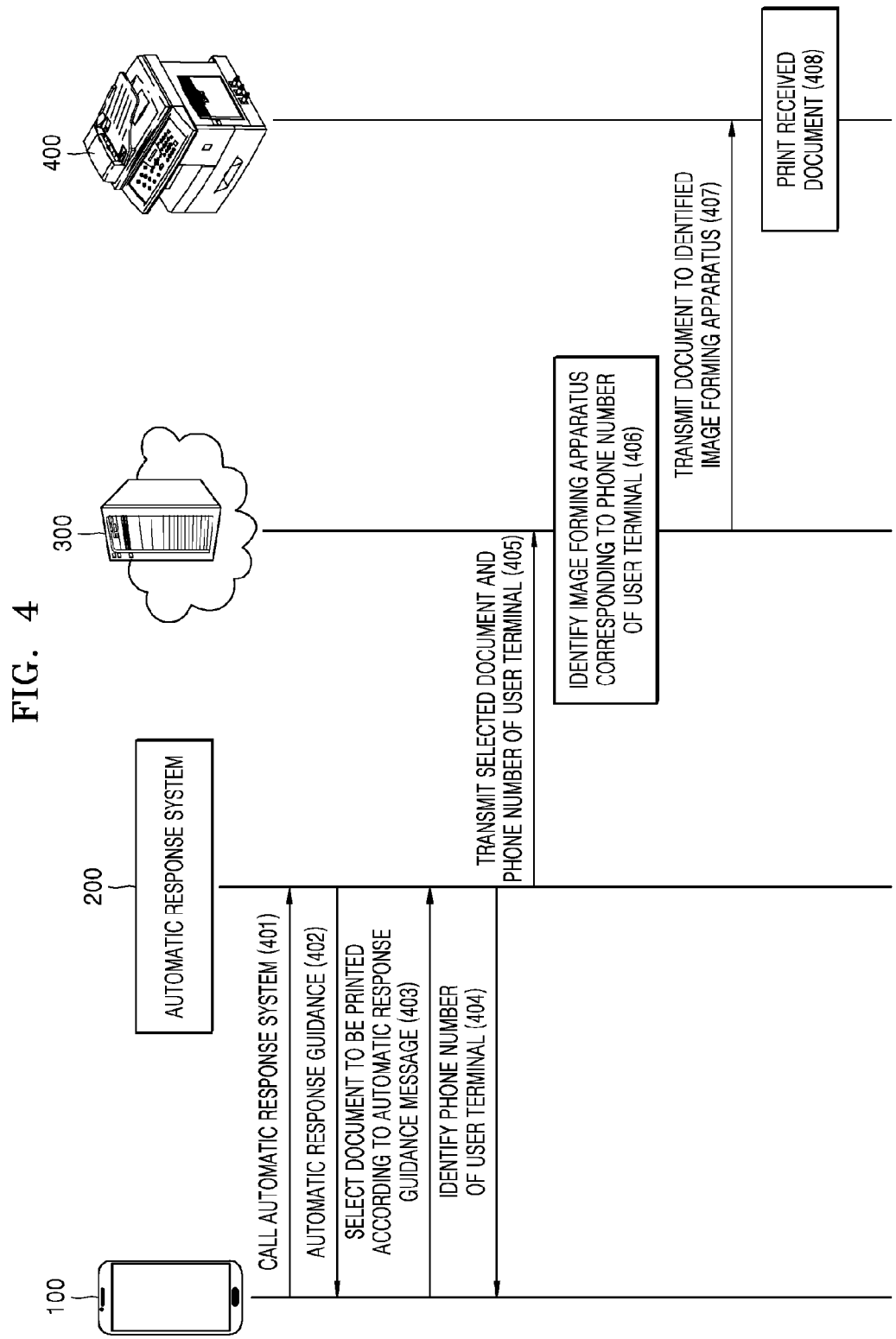
Figure 5:
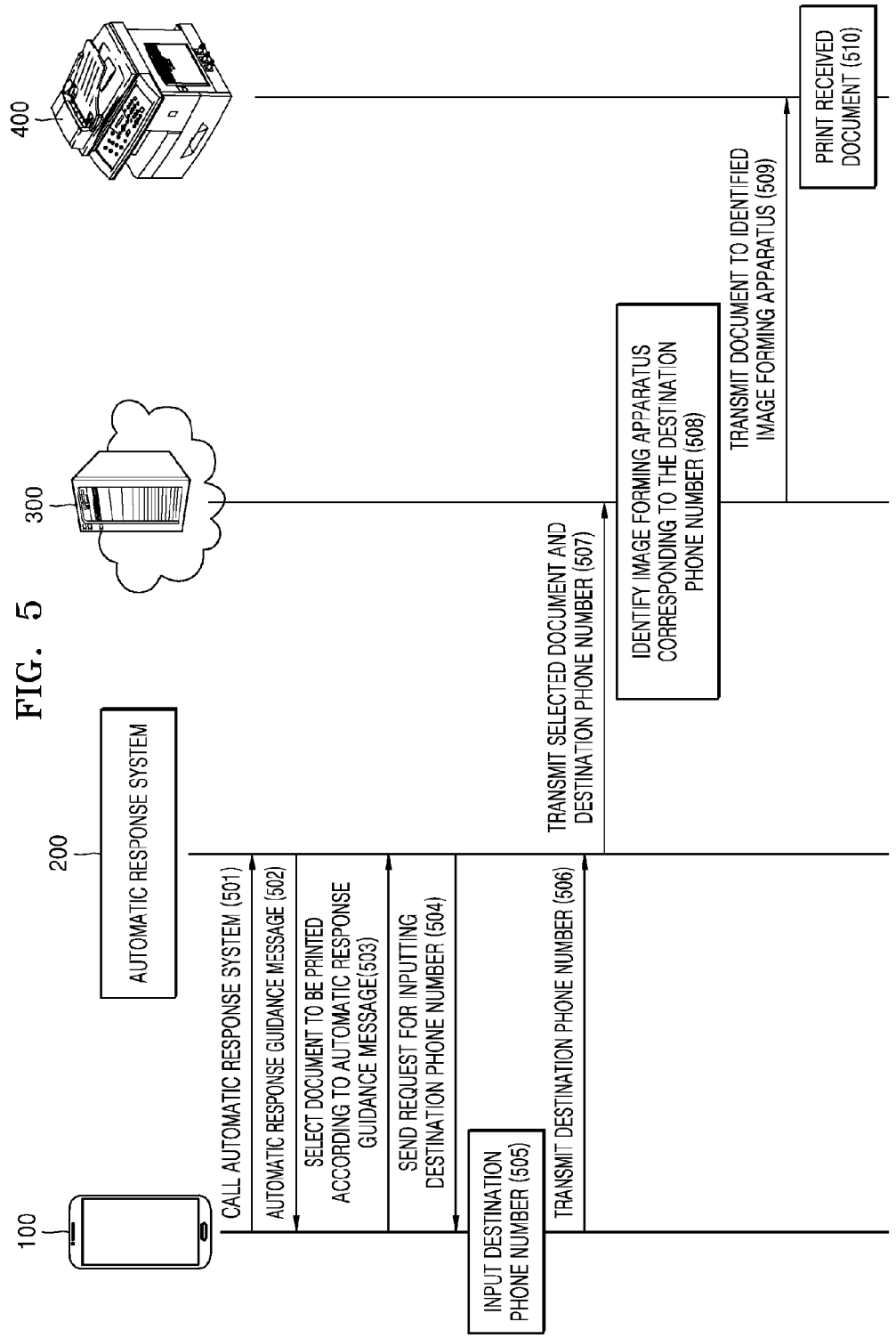

FIGS. 4 and 5 respectively illustrate an embodiment in which a phone number of the user terminal 100 is determined as a destination phone number and an embodiment in which a separate destination phone number is input.

Operation 304 is further included in an embodiment of FIG. 3 in comparison with embodiments of FIGS. 4 and 5. Operations 301, 302, 303, 306, 307, and 308 in FIG. 3 correspond to operations 401, 402, 403, 406, 407, and 408. Therefore, only different operations including operations 404 and 405 in FIG. 4 will be described herein and descriptions of identical operations will be omitted.

Referring to FIG. 4, the automatic response system 200 identifies a phone number of the user terminal 100 in operation 404 and determines the phone number of the user terminal 100 as a destination phone number. Therefore, the automatic response system 200 transmits the selected document and phone number of the user terminal 100, which is the destination phone number, to the cloud print server 300 in operation 405.

Referring to FIG. 5, operations 301, 302, 303, 305, 306, 307, and 308 in FIG. 3 correspond to operations 501, 502, 503, 507, 508, 509, and 510. Therefore, only different operations including operations 504, 505, and 506 in FIG. 5 will be described herein and descriptions of identical operations will be omitted. The automatic response system 200 requests the user terminal 100 to input the destination phone number in operation 504. When the user inputs the destination phone number via the user terminal 100 in operation 505, the user terminal 100 transmits the input destination phone number to the automatic response system 200 in operation 506.

Figure 6:
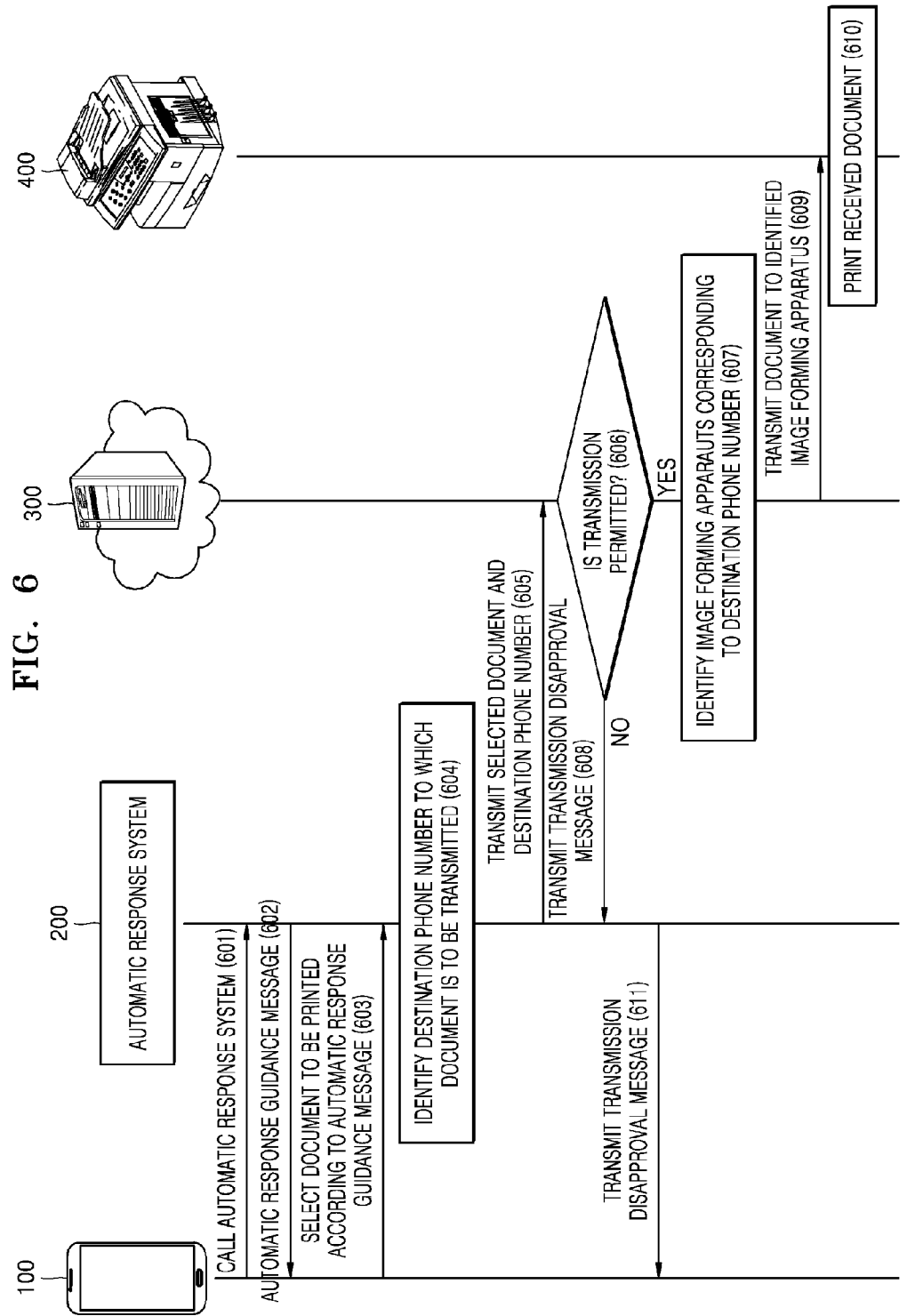

FIG. 6 illustrates an embodiment in which a determination as to whether transmission of a document is permitted is made. Operations 301, 302, 303, 304, 305, 306, 307, and 308 in FIG. 3 correspond to operations 601, 602, 603, 604, 605, 607, 609, and 610. Descriptions of operations of FIG. 6 which are the same as in FIG. 3 will be omitted. Therefore, only different operations including operations 606, 608, and 611 in FIG. 6 will be described Referring to FIG. 6, when the cloud print server 300 receives a document and destination phone number which are selected by the automatic response system 200, the determinate as to whether the transmission of a document is permitted is made in operation 606. If the transmission is permitted in operation 606, an image forming apparatus corresponding to the destination phone number is identified in operation 607. However, if the transmission is not permitted in operation 606, a transmission disapproval message is transmitted to the automatic response system 200 in operation 608, and the automatic response system 200 transmits the transmission disapproval message to the user terminal 100 in operation 611.

Determining whether the transmission is permitted is performed because the cloud print server 300 cannot transmit a document received from an arbitrary automatic response system to an image forming apparatus without authentication, unless the document is received from a registered user. A detailed method of making a determination as to whether the transmission is permitted will be described with reference to FIGS. 7 and 8.

Figure 7:
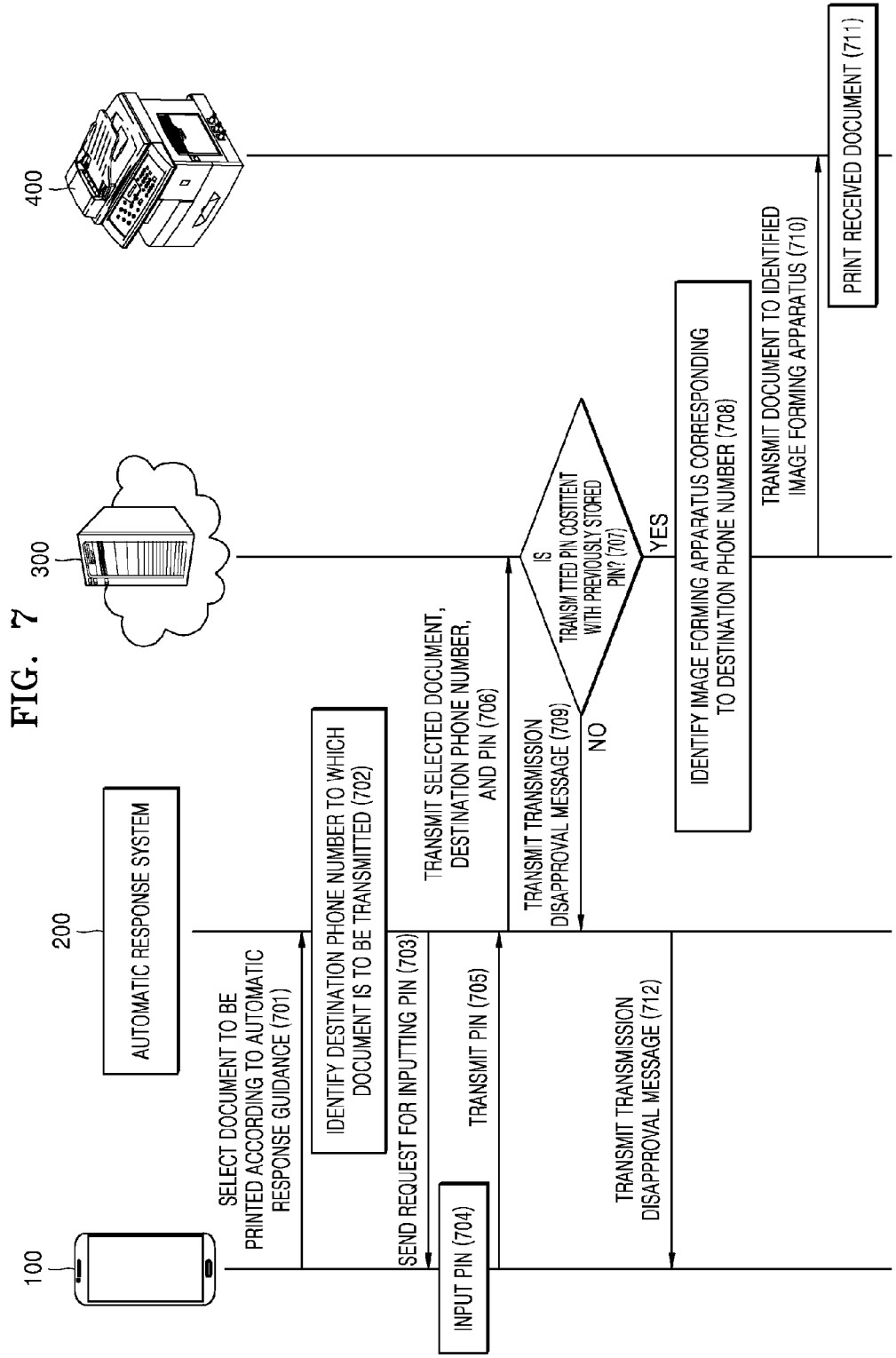

Referring to FIG. 7, when the user selects a document to be printed according to automatic response guidance via the user terminal 100 in operation 701, the automatic response system 200 identifies the destination phone number of the destination to which the document is transmitted in operation 702.

The automatic response system 200 requests the user terminal 100 to input a PIN in operation 703. When the user inputs the PIN in operation 704, the user terminal 100 transmits the automatic response system 200 to the input PIN in operation 705.

The automatic response system 200 transmits the selected document, destination phone number, and PIN to the cloud print server 300 in operation 706. In operation 707, the cloud print server 300 determines whether the received PIN is consistent with the previously stored PIN in order to correspond to the destination phone number. After the determination is made, if the received PIN is consistent with the previously stored PIN, the cloud print server 300 identifies the image forming apparatus corresponding to the destination phone number in operation 708. However, if the received PIN is not consistent with the previously stored PIN, the cloud print server 300 transmits a transmission disapproval message to the automatic response system 200 in operation 709.

Remaining operations 708, 710, 711, and 712 of FIG. 7 are the same as the above described operations such as operation 607, 609, 610, and 611 included in one or more embodiments, and thus, detailed descriptions of the remaining operations will be omitted.

Figure 8:
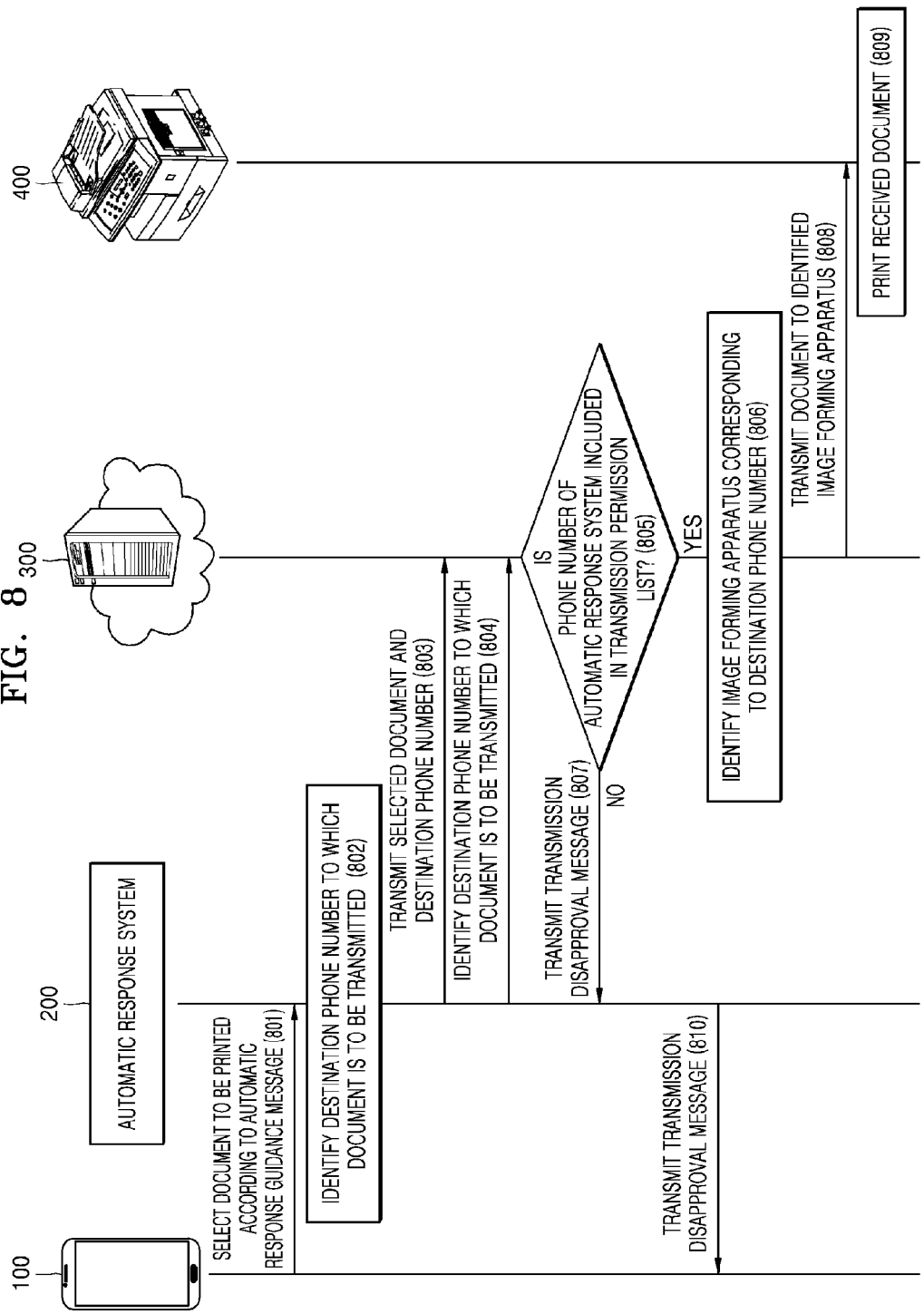

Referring to FIG. 8, when the user selects a document to be printed according to the automatic response guidance via the user terminal 100 in operation 801, the automatic response system 200 identifies the destination phone number of the destination to which the document is transmitted in operation 802. The automatic response system 200 transmits the selected document and destination phone number to the cloud print server 300 in operation 803.

The cloud print server 300 identifies the phone number of the automatic response system 200 in operation 804 and determines whether the phone number of the automatic response system 200 is included in a transmission permission list in operation 805. After the determination is made, if the phone number of the automatic response system 200 is included in the transmission permission list, operation 806 is performed, and if the phone number of the automatic response system 200 is not included in the transmission permission list, it is determined that the transmission is not permitted, and thus, a transmission disapproval message is transmitted to the automatic response system 200 in operation 807.

Remaining operations of 808, 809, and 810 of FIG. 8 are the same as the above described operations such as operations 710, 711, and 712 included in one or more embodiments, and thus, detailed descriptions of the remaining operations of FIG. 8 will be omitted.

Figure 9:
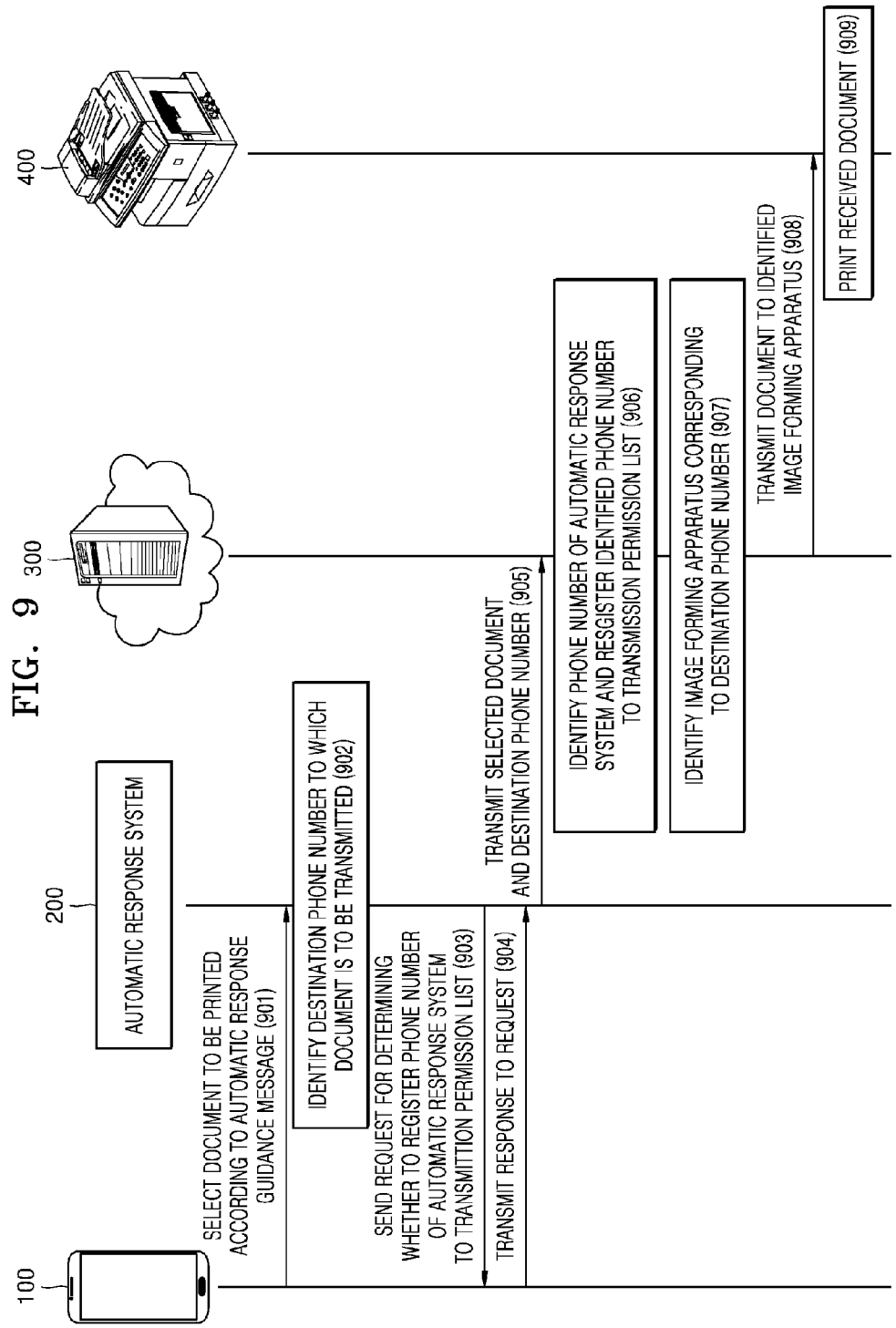

FIG. 9 illustrates an embodiment in which the phone number of the automatic response system 200 is registered in the transmission permission list in response to a user request.

Referring to FIG. 9, when the user selects a document to be printed according to automatic response guidance via the user terminal 100 in operation 901, the automatic response system 200 identifies the destination phone number of the destination to which the document is to be transmitted in operation 902.

In operation 903, the automatic response system 200 transmits a request for identifying whether to register the phone number of the automatic response system 200 in the transmission permission list, to the user terminal 100. If the user agrees with the registration of the phone number in the transmission permission list, the user terminal 100 transmits a response to request in operation 904 regarding whether to register the phone number of the automatic response system 200 in the transmission permission list, to the user terminal 100.

The automatic response system 200 transmits the selected document and destination phone number to the cloud print server 300 in operation 905. The cloud print server 300 identifies a phone number of the automatic response system and registers the identified phone number to the transmission permission list in operation 906.

Remaining operations 907, 908, and 909 of FIG. 9 are the same as the above described operations such as operations 806, 808, and 809 included in the above embodiments, and thus, detailed descriptions of the remaining operations will be omitted.

Figure 10:
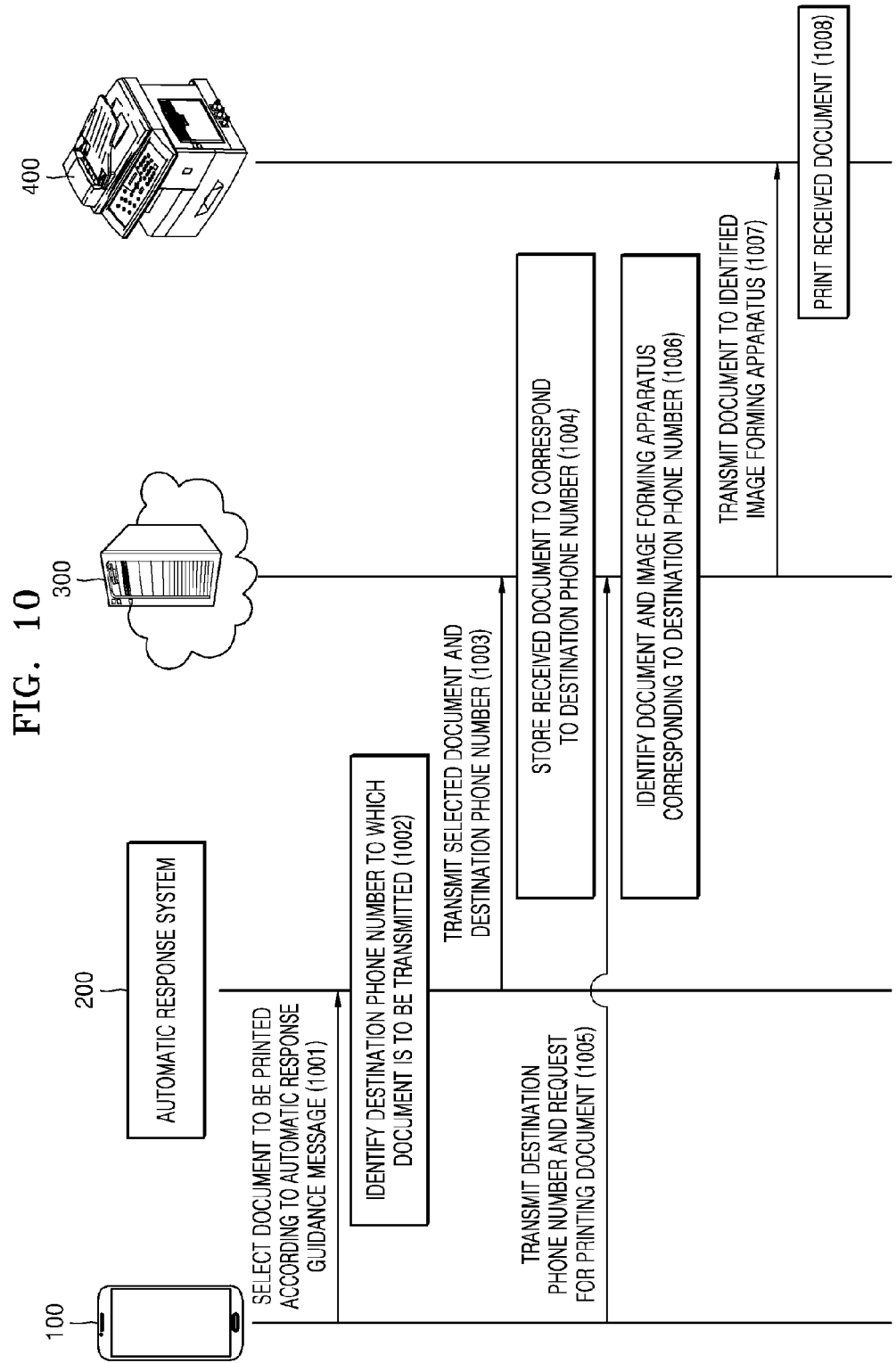

FIG. 10 illustrates an embodiment in which a pull printing method is used.

Referring to FIG. 10, when the user selects a document to be printed according to automatic response guidance via the user terminal 100 in operation 1001, the automatic response system 200 identifies the destination phone number of the destination to which the document is to be transmitted in operation 1002. In operation 1003, the automatic response system 200 transmits the selected document and destination phone number to the cloud print server 300.

The cloud print server 300 stores the received document to correspond to the received destination phone number in operation 1004. The cloud print server 300 does not immediately transmit the received document to the image forming apparatus and postpone the transmission until a print request is received from the user terminal 100.

When the user terminal 100 transmits the destination phone number and the print request to the cloud print server 300 in operation 1005, the cloud print server 300 identifies a document and the image forming apparatus corresponding to the destination phone number in operation 1006.

The cloud print server 300 transmits the stored document to the identified image forming apparatus 400 in operation 1007, and the image forming apparatus 400 prints the received document to the image forming apparatus 400 in operation 1008.

FIGS. 11 through 14 illustrate a process of selecting a document to be printed from a user terminal by using automatic response guidance, the process included in a cloud print method using an automatic response system according to embodiments.

Figure 11:
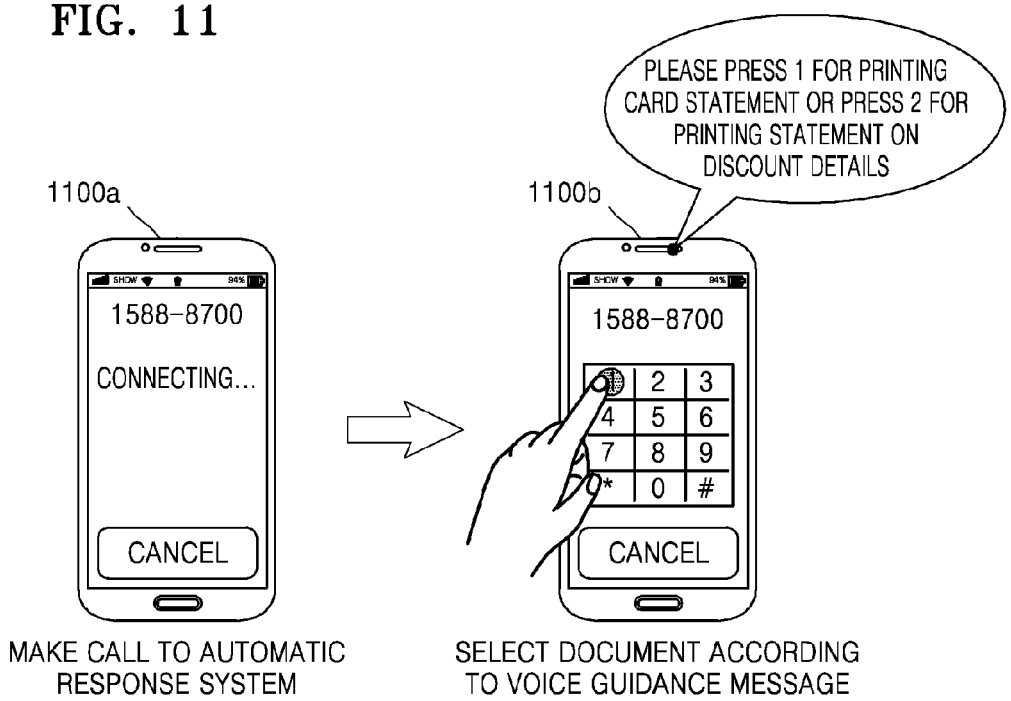
FIGS. 11 through 14 illustrate a process of selecting a document to be printed from a user terminal by using automatic response guidance, the process being included in a cloud print method using an automatic response system according to embodiments.

A first screen 1100a of FIG. 11 is a screen displayed on a user terminal while the user calls to the automatic response system at 1588-8700. When the call is connected to the automatic response system, voice guidance is provided via the user terminal, a key pad via which numbers are input in accordance with manipulation of the user terminal, as shown in a second screen 1100b, is displayed.

When a menu for printing a document is displayed by inputting numbers on the key pad, voice guidance regarding a printable document is provided as shown in FIG. 11, and the user selects a number corresponding to a document to be printed. In FIG. 11, the automatic response system is used by a credit card company, and the printable document is a card statement and statement on discount details.

When the printable document is selected, the automatic response system identifies the destination phone number to which the selected document is transmitted, and as described above, the phone number of the user terminal may be determined as the destination phone number, or a separate destination phone number may be input by the user.

Figure 12:
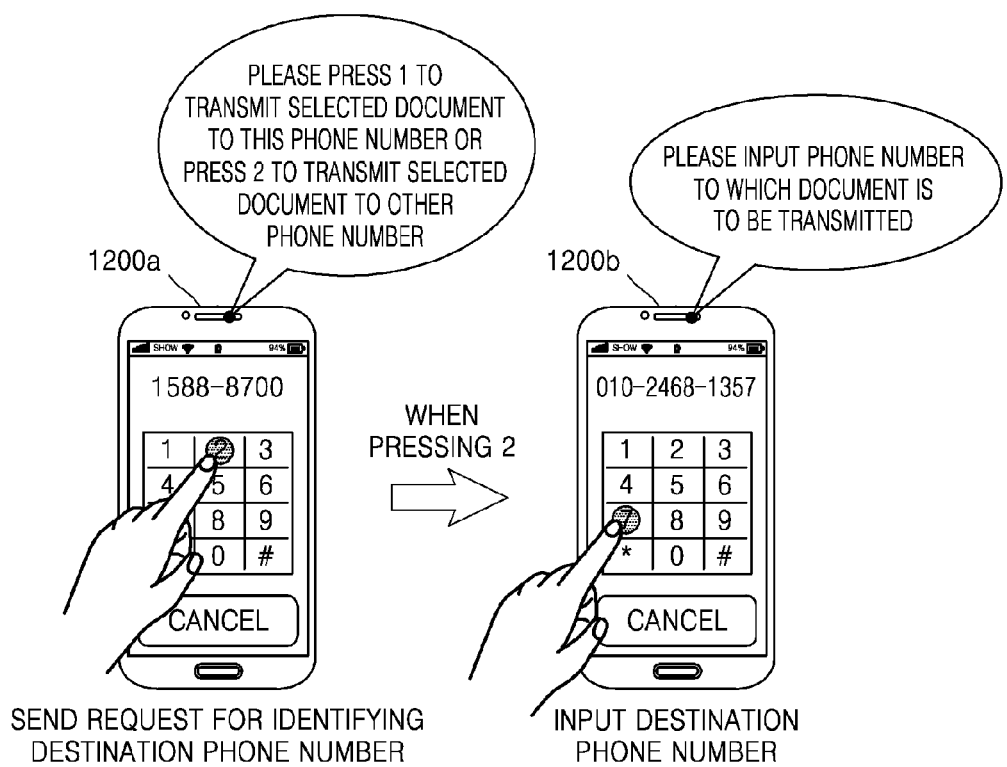

FIG. 12 illustrates a screen displayed on the user terminal when the separate destination phone number is input by the user.

A voice guidance message requesting the user to transmit a selected document to a phone number of the user terminal or to input another destination phone number is provided via a first screen 1200a. As shown in FIG. 12, when the user selects a number 2 (inputting another destination phone number), the automatic response system transmits a request for inputting a destination phone number to the user terminal, and the user terminal provides a screen for receiving the destination phone number and a voice guidance message via a second screen 1200b. When the user uses a key pad to input the destination phone number (010-2468-1357), the user terminal transmits the input destination phone number to the automatic response system.

The automatic response system receiving the destination phone number identifies an image forming apparatus corresponding to the destination phone number, and a process of transmitting a selected document is the same as above.

Figure 13:
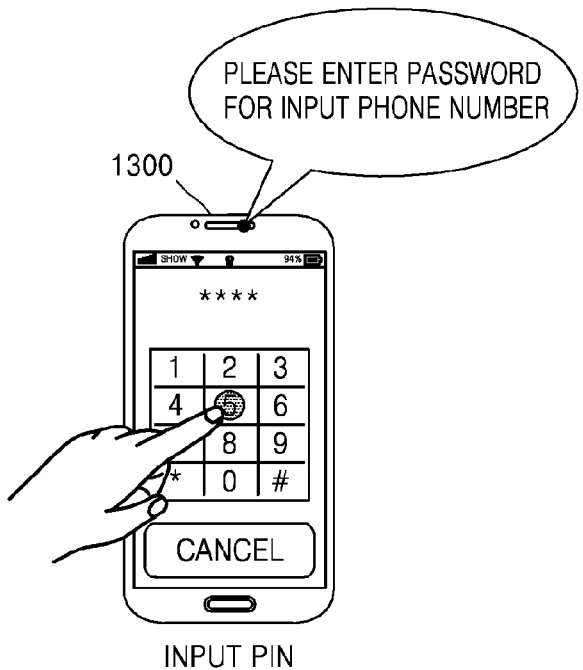
Figure 14:
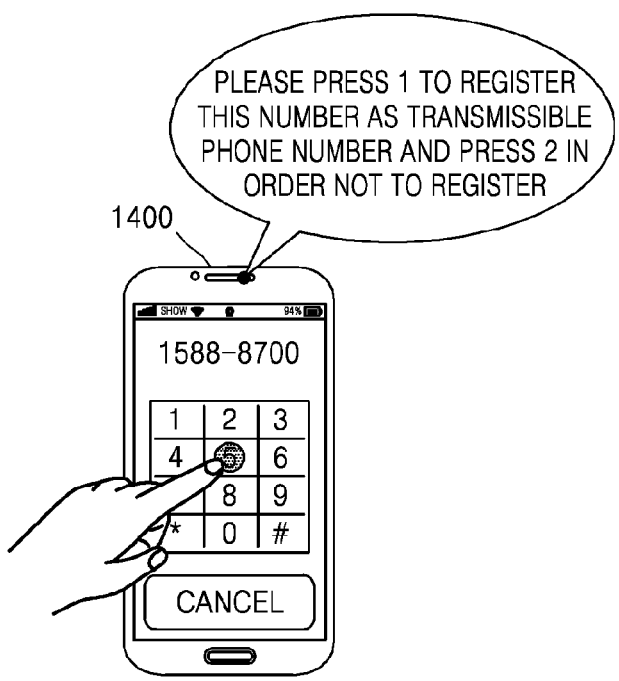

FIGS. 13 and 14 respectively illustrate a screen of the user terminal which is configured to send a request of inputting a PIN and a screen thereof which is configured to send a request for identifying whether a phone number of the automatic response system is included in a transmission permission list.

Referring to FIG. 13, a key pad is displayed on a screen 1300 of the user terminal and voice guidance requesting an input of passwords corresponding to the destination phone number, that is, an input of a PIN, is provided. When the user inputs the PIN according to the voice guidance, the user terminal transmits the input PIN to the automatic response system, and the automatic response system transmits the PIN to a cloud print server. The cloud print server compares the received PIN with previously stored PIN and determines whether transmission of the document is permitted.

Referring to FIG. 14, a key pad is displayed on a screen 1400 of the user terminal, and voice guidance requesting the user to determine whether to register a phone number of the automatic response system to the transmission permission list is provided. In FIG. 14, the user may press 1 when the user agrees with registration of the phone number to the transmission permission list, or the user may press 2 when the user disagrees with the registration. When the user presses 1 to agree with the registration, phone number 1588-8700 of the automatic response system is registered to a transmission permission list stored in a cloud print server.

FIGS. 15 through 18 illustrate a process of transmitting the selected document to an image forming apparatus corresponding to a destination phone number due to the synchronization of a cloud print server with an automatic response system, according to embodiments.

Figure 15:
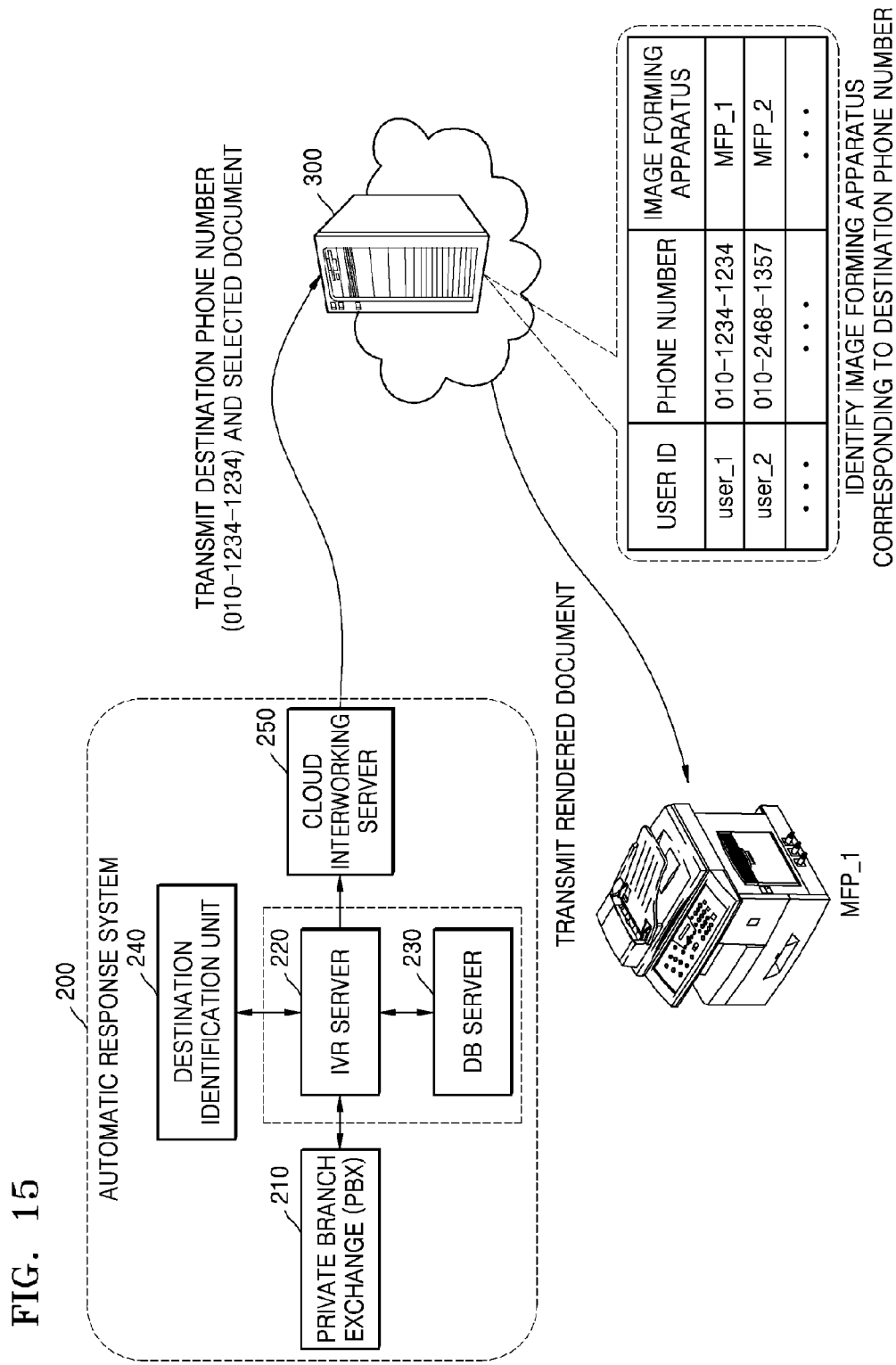
FIGS. 15 through 18 illustrate a process of transmitting the selected document to an image forming apparatus corresponding to a destination phone number by synchronization of a cloud print server with an automatic response system, according to embodiments.

Referring to FIG. 15, a table to which an image forming apparatus corresponding to at least one phone number is registered is stored in the cloud print server 300. That is, when a request for transmitting a document to a destination phone number registered in the table is received, the cloud print server 300 transmits the document to an image forming apparatus corresponding to the destination phone number.

A user ID, phone number and an image forming apparatus corresponding thereto are mapped in the table of FIG. 15. An account whose user ID is user_1, MFP_1 is registered to correspond to phone number 010-1234-1234 and an account whose user ID is user_2, MFP_2 is registered to correspond to phone number 010-2468-1357.

When the destination phone number (010-1234-1234) and selected document are received from the cloud interworking server 250 of the automatic response system 200, the cloud print server 300 uses a stored table to identify that the image forming apparatus corresponding to the destination phone number is MFP_1. The cloud print server 300 renders the received document and transmits the rendered document to the identified image forming apparatus (MFP_1).

Figure 16:
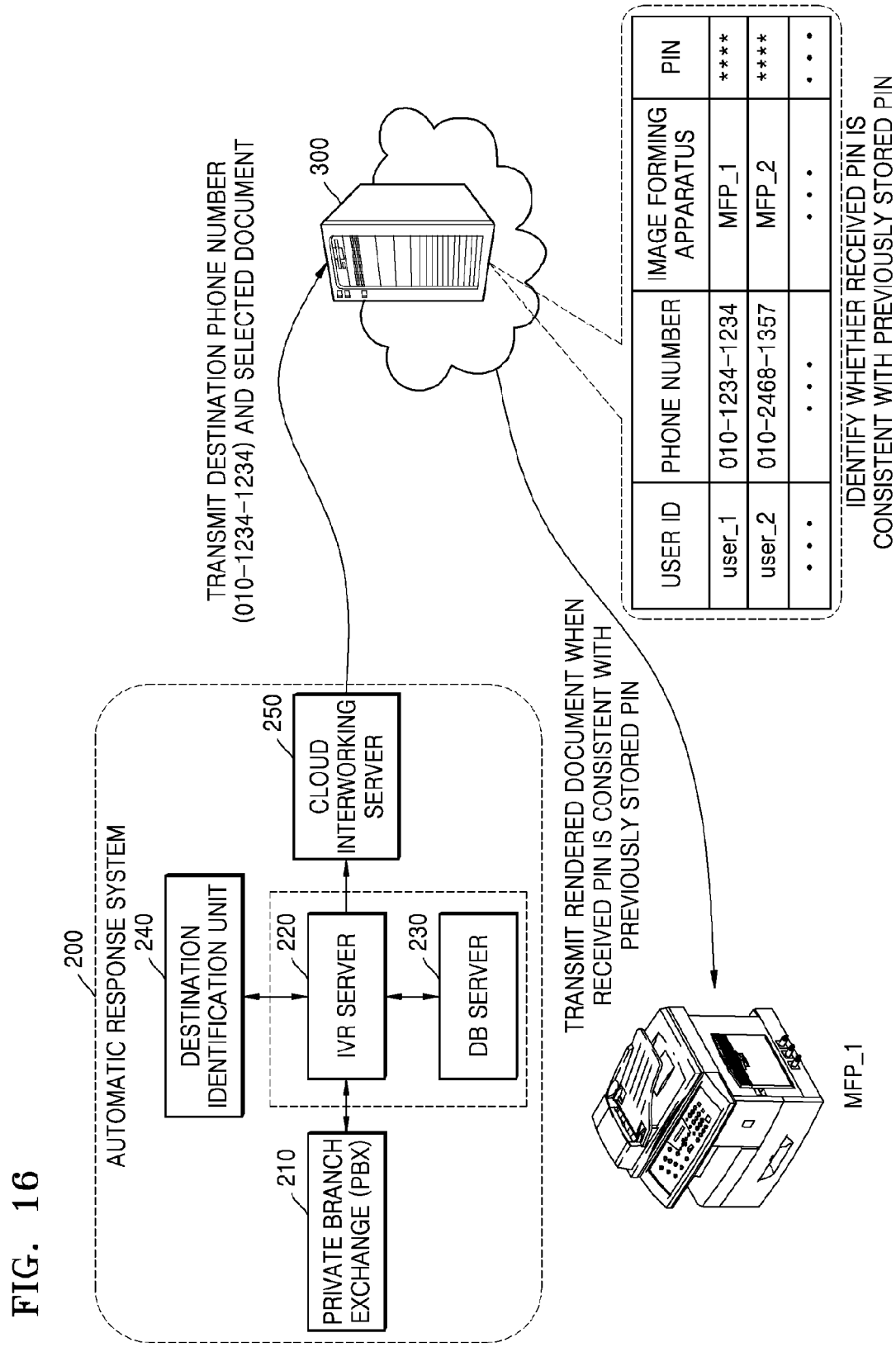

FIG. 16 illustrates an embodiment in which a determination as to whether transmission of a document is permitted is made by using a PIN.

Referring to FIG. 16, a PIN may be additionally stored in a table stored in the cloud print server 300. The PIN is used to determine whether the transmission is permitted. In detail, when a PIN input by the user is received together with the destination phone number (010-1234-1234) and selected document from the automatic response system 200, the cloud print server 300 determines whether the received PIN is consistent with a PIN stored in the table. That is, the received PIN is compared with the PIN stored in the table to correspond to the received destination phone number (010-1234-1234) and a determination as to whether the received PIN is consistent with a PIN stored in the table is made.

If it is determined that the received PIN is consistent with a PIN stored in the table, the cloud print server 300 renders the received document and transmits the rendered document to the image forming apparatus (MFP_1) corresponding to the destination phone number (010-1234-1234).

Figure 17:
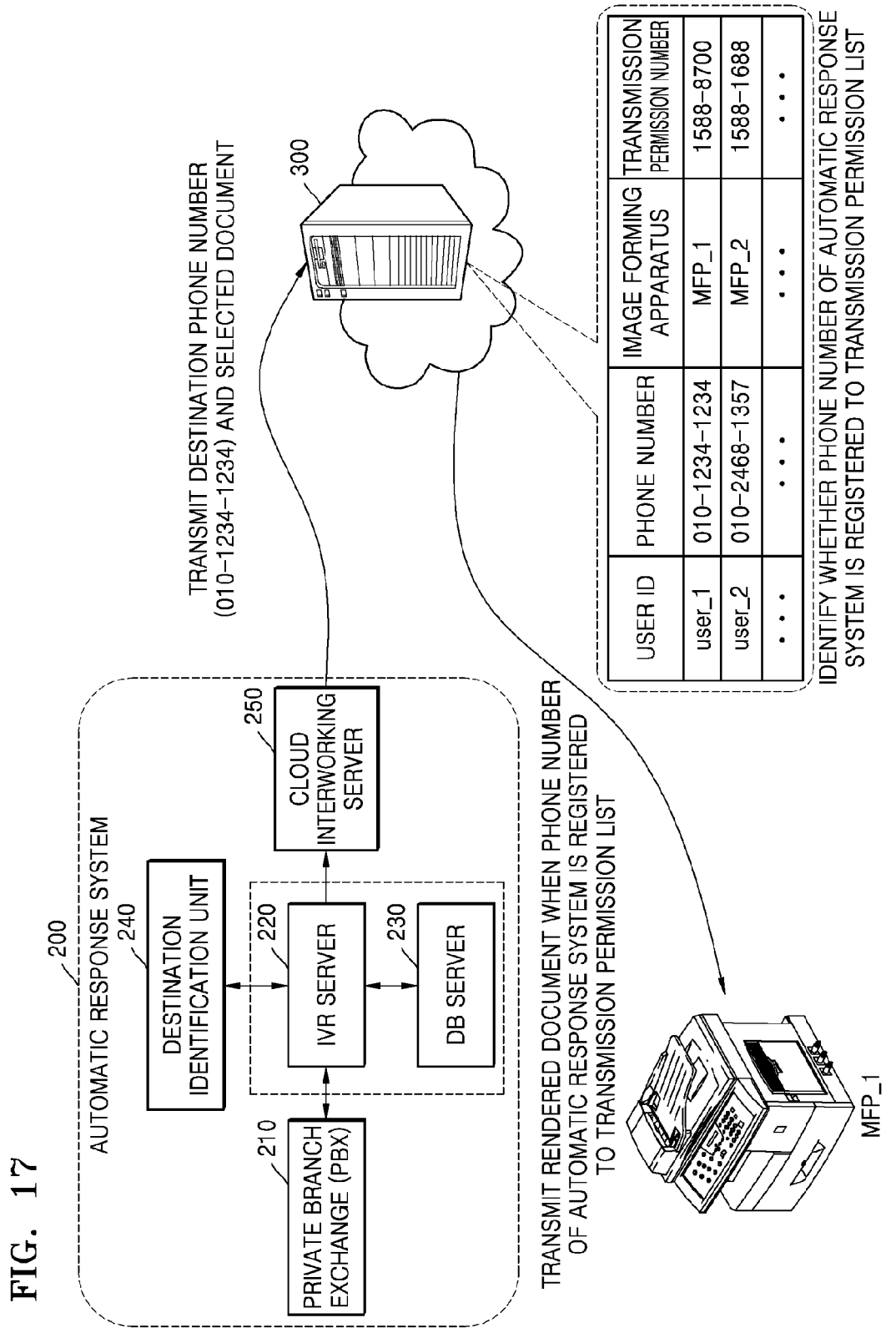

FIG. 17 illustrates an embodiment in which a determination as to whether transmission of a document is permitted is made by using a transmission permission list.

Referring to FIG. 17, a table stored in the cloud print server 300 may further include a transmission permission list having transmissible phone numbers. When the destination phone number (010-1234-1234) and selected document are received from the automatic response system 200, the cloud print server 300 identifies a phone number of the automatic response system 200 and determines whether the identified phone number is included in the table. In detail, the cloud print server 300 determines whether the phone number of the automatic response system 200 is included in the transmission permission list corresponding to the destination phone number (010-1234-1234).

In FIG. 17, when the phone number of the automatic response system 200 which is identified by the cloud print server 300 is 1588-8700, the phone number is included in a phone number included in the transmission permission list, and thus, it is determined that the transmission is permitted. Therefore, the cloud print server 300 renders the received document and transmits the rendered document to the image forming apparatus (MFP_1) corresponding to the destination phone number (010-1234-1234).

Figure 18:
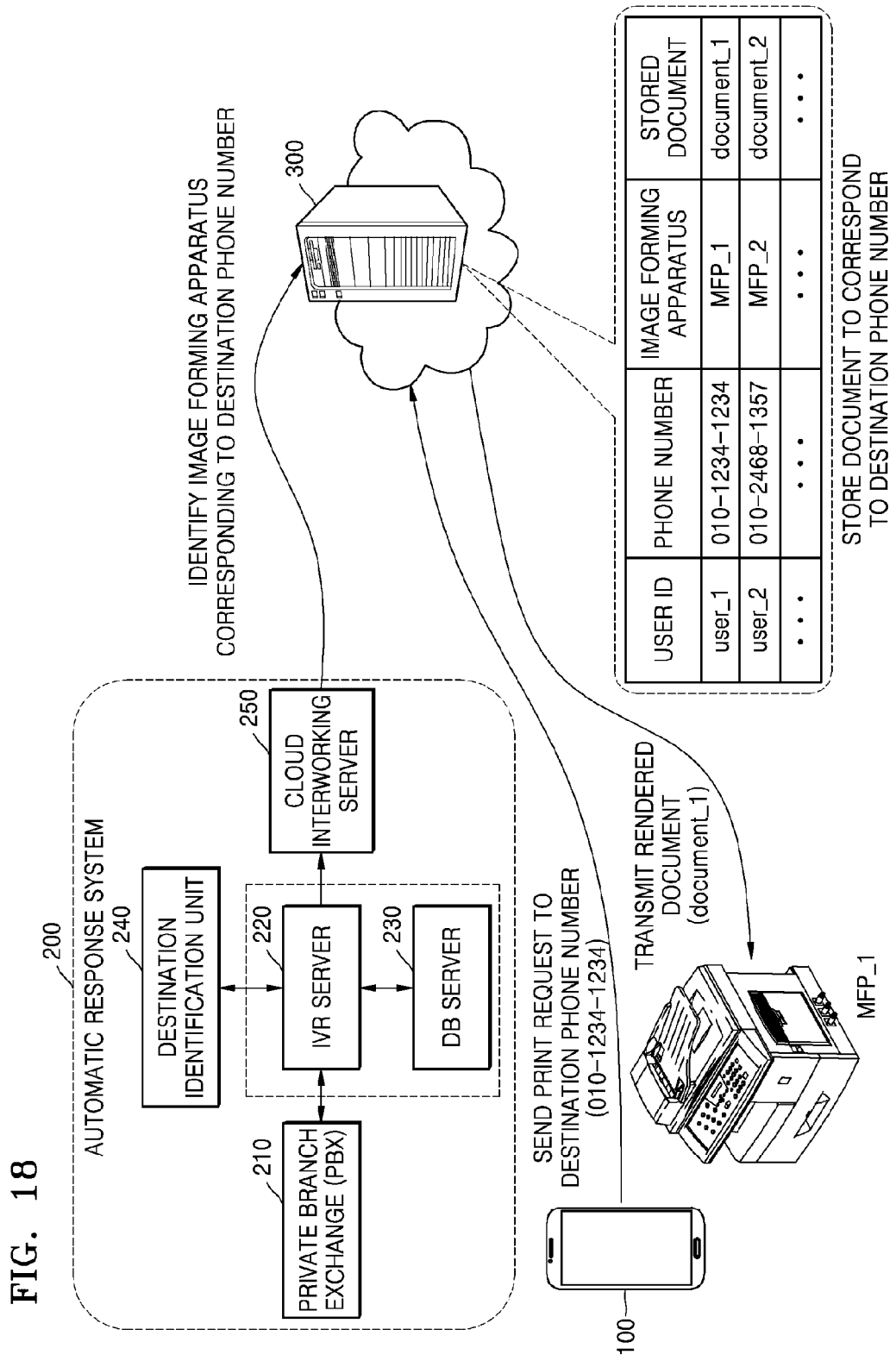

FIG. 18 illustrates an embodiment of a pull printing method.

Referring to FIG. 18, a document corresponding to a destination phone number may be stored in the cloud print server 300. That is, when a destination phone number and selected document are received from the automatic response system 200, the cloud print server 300 stores the received document to correspond to the destination phone number. The stored document is not transmitted to the image forming apparatus until a print request is received from the user.

When a pull printing request regarding the destination phone number (101-1234-1234) is received from the user terminal 100, the cloud print server 300 renders a stored document (document_1) to correspond to the destination phone number (010-1234-1234) and transmits the rendered document (document_1) to the image forming apparatus (MFP_1).

FIGS. 19 through 22 are flowcharts of a cloud print method using an automatic response system, according to embodiments.

Figure 19:
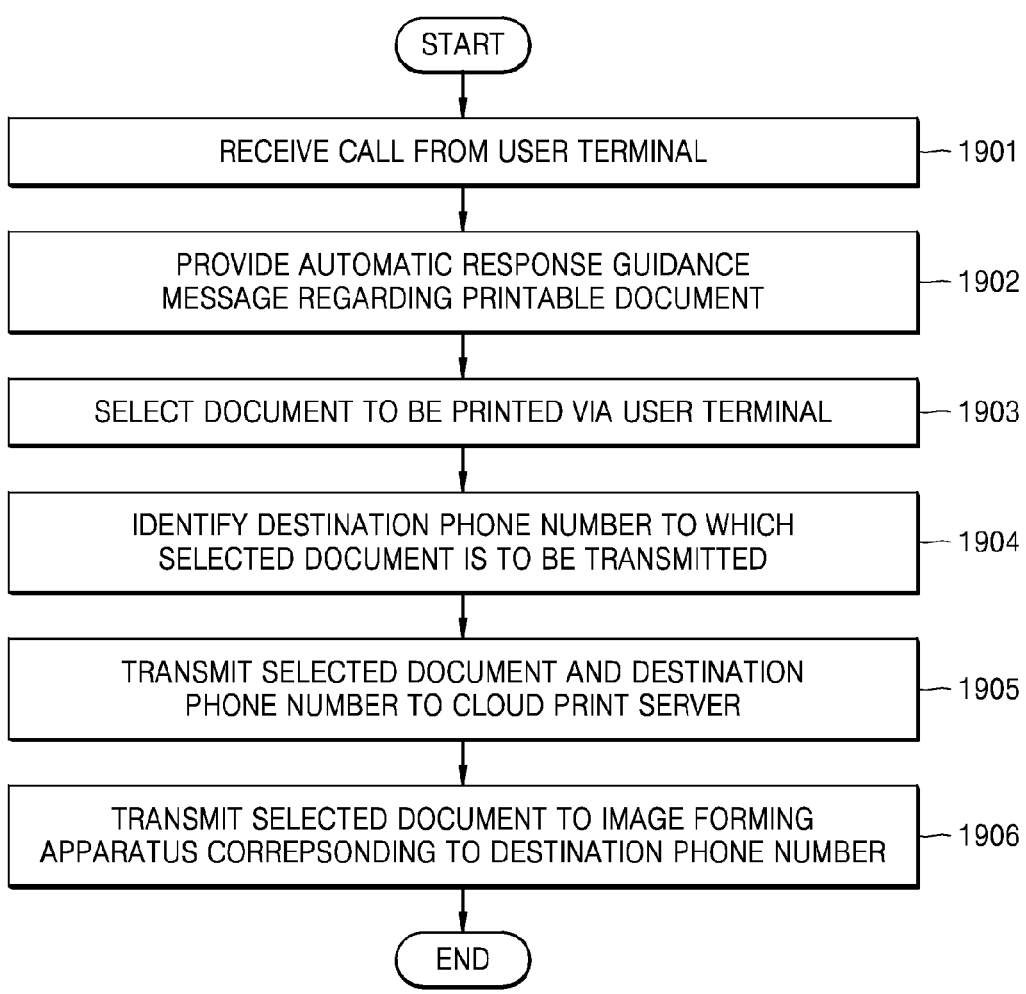
FIGS. 19 through 22 are flowcharts of a cloud print method using an automatic response system, according to embodiments.

Referring to FIG. 19, the automatic response system receives a call from a user terminal in operation 1901. The automatic response system provides automatic response guidance regarding a printable document to the user terminal in operation 1902. If a user selects a document to be printed via the user terminal in operation 1903, the automatic response system identifies a destination phone number to which the selected document is selected in operation 1904.

The automatic response system transmits the selected document and destination phone number to a cloud print server in operation 1905, and the cloud print server transmits the received document to an image forming apparatus corresponding to the destination phone number in operation 1906.

Figure 20:
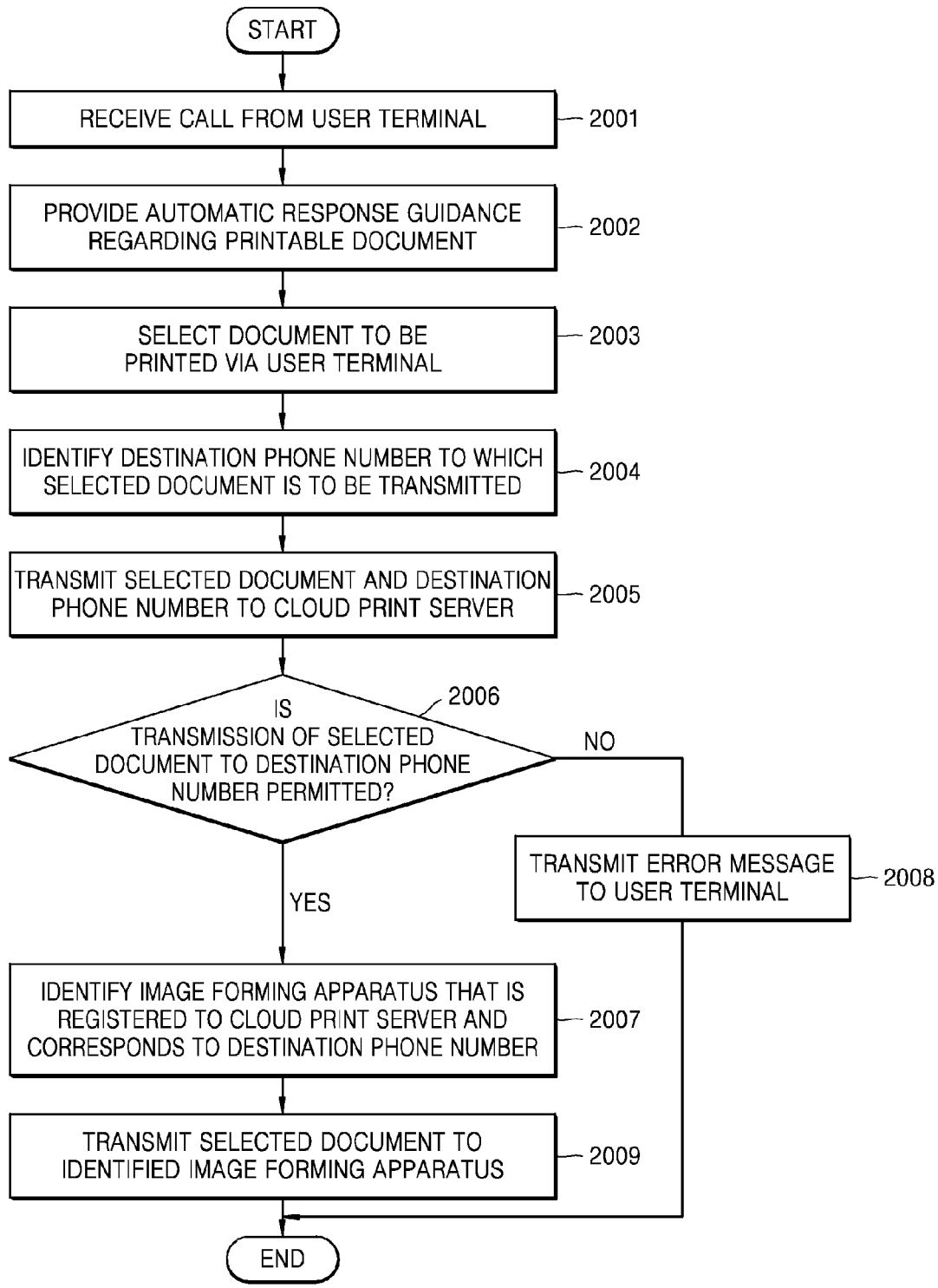

Referring to FIG. 20, the automatic response system receives a call from the user terminal in operation 2001 and provides automatic response guidance regarding a printable document to the user terminal in operation 2002. When the user selects a document to be printed via the user terminal in operation 2003, the automatic response system identifies a destination phone number to which the selected document is to be transmitted in operation 2004.

The automatic response system transmits the selected document and destination phone number to the cloud print server in operation 2005, and the cloud print server determines whether transmission of a document to the received destination phone number is permitted in operation 2006. If the transmission is permitted, the cloud print server identifies an image forming apparatus registered in the cloud print server to correspond to the received destination phone number in operation 2007 and transmits the selected document to the identified image forming apparatus in operation 2009. However, if the transmission is not permitted in operation 2006, an error message is transmitted to the user terminal in operation 2008.

Figure 21:
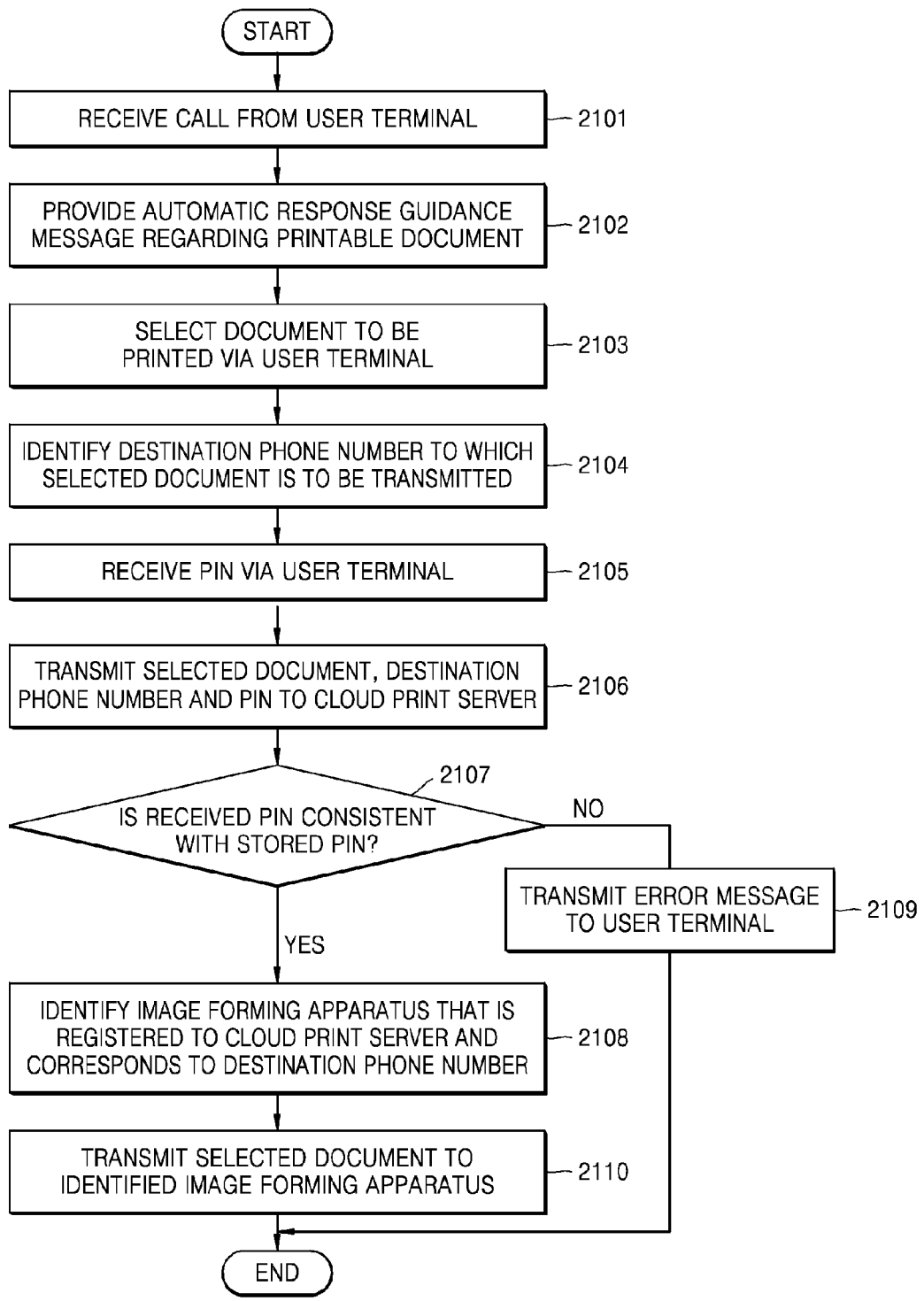

Referring to FIG. 21, the automatic response system receives a call from the user terminal in operation 2101 and provides the user terminal with automatic response guidance regarding a printable document in operation 2102. When the user selects a document to be printed via the user terminal in operation 2103, the automatic response system identifies a destination phone number to which the selected document is to be transmitted in operation 2104.

The automatic response system receives a PIN from the user via the user terminal in operation 2105 and transmits the selected document, destination phone number, and PIN to a cloud print server in operation 2106.

The cloud print server determines whether the received PIN is consistent with a previously stored PIN in order to correspond to the received destination phone number in operation 2107. After it is determined that the received PIN is consistent with the previously stored PIN, the cloud print server identifies am image forming apparatus registered to correspond to the destination phone number in operation 2108 and transmits the selected document to the identified image forming apparatus in operation 2110. However, when it is determined that the received PIN is inconsistent with the previously stored PIN in operation 2107, an error message is transmitted to the user terminal in operation 2109.

Figure 22:
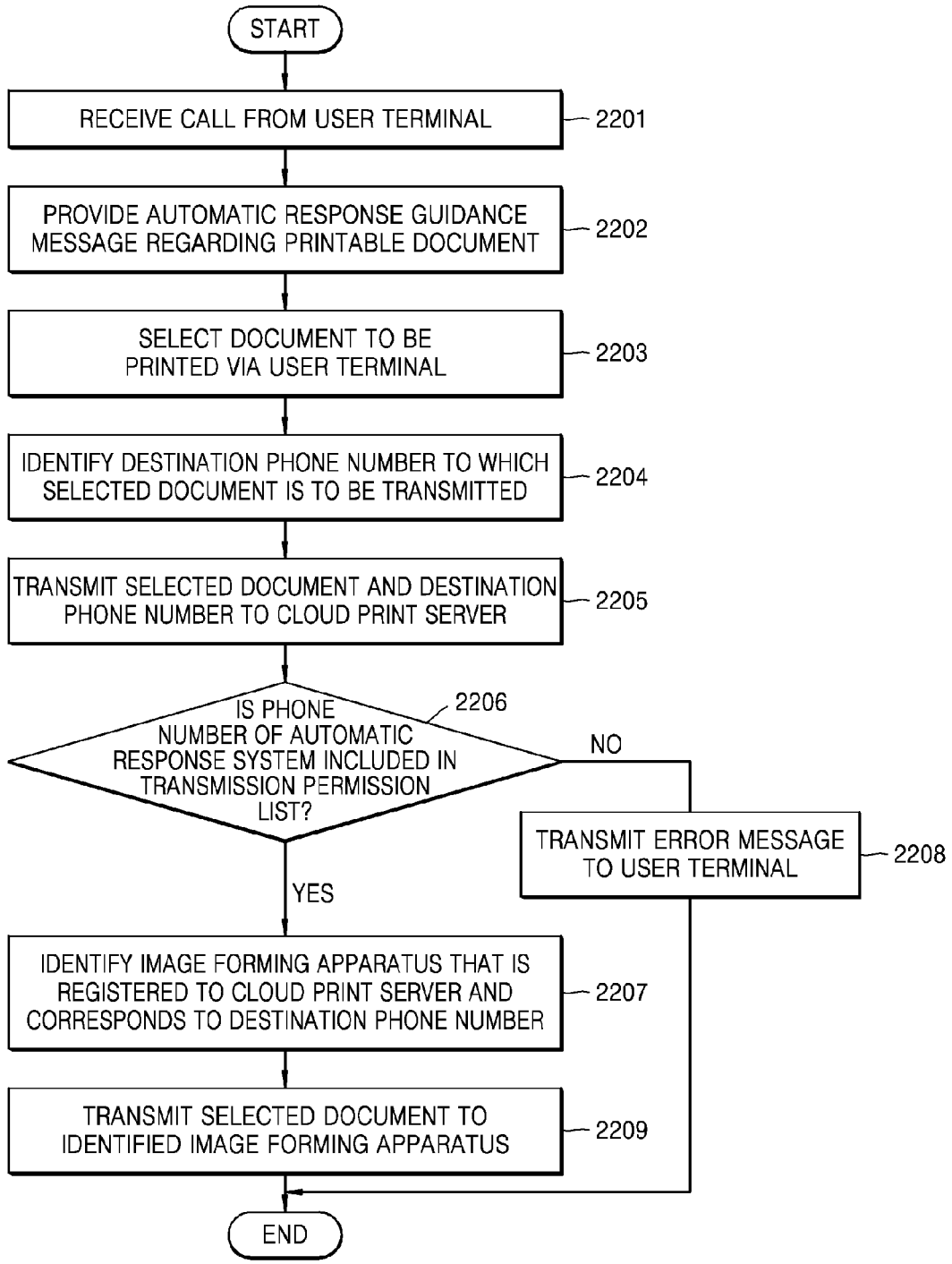

Referring to FIG. 22, the automatic response system receives a call from the user terminal in operation 2201 and provides the user terminal with automatic response guidance in operation 2202. When the user selects a document to be printed via the user terminal in operation 2203, the automatic response system identifies a destination phone number to which the selected document is to be transmitted in operation 2204.

When the automatic response system transmits the selected document and destination phone number to a cloud print server in operation 2205, the cloud print server determines whether a phone number of the automatic response system is registered to the transmission permission list in operation 2206. After it is determined that the phone number is registered to the transmission permission list, the cloud print server identifies the image forming apparatus registered to correspond to the destination phone number in operation 2207 and transmits the selected document to the identified image forming apparatus in operation 2209. However, after it is determined that the phone number is not registered to the transmission permission list in operation 2206, an error message is transmitted to the user terminal in operation 2208.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems or computing devices connected through a network and program instructions may be stored and executed in a decentralized manner. In addition, the computer-readable media may also be embodied in at least one application specific integrated circuit (ASIC) or Field Programmable Gate Array (FPGA).

Aspects of embodiments may be implemented over a wired or wireless network, or a combination thereof. A network may include a private branch exchange (PBX), a local area network (LAN), wireless local area network (WLAN), wide area network (WAN), personal area network (PAN), virtual private network (VPN), or the like. For example, wireless communication between elements of example embodiments may be performed via a wireless LAN, Wi-Fi, Bluetooth, Zigbee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like.

As described above, according to the one or more of above exemplary embodiments, the user may print a selected document via an image forming apparatus that is registered to a cloud print system and corresponds to a phone number of the user by only performing an operation of selecting a document according to automatic response guidance message. Alternatively, the user may print a selected document via a desired image forming apparatus by selecting a document and inputting a destination phone number corresponding to the image forming apparatus according to automatic response guidance message. Therefore, user convenience may be improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A cloud print method comprising:
   by an automatic response system including at least one server and having a corresponding phone number:
   receiving a call from a user terminal;
   providing the user terminal with an automatic response voice guidance message regarding a plurality of documents;
   selecting a document to be printed from the plurality of documents communication with the user terminal;
   identifying a destination phone number to which the selected document is to be transmitted; and
   transmitting the selected document and destination phone number from the automatic response system to a cloud print server and
   by the cloud print server:
   determining if transmission of the selected document to the destination phone number is permitted by identifying the corresponding phone number of the automatic response system and by determining if the identified corresponding phone number of the automatic response system is included in a transmission permission list stored in the cloud print server; and
   if it is determined that the transmission of the selected document to the destination phone number is permitted, transmitting the selected document from the cloud print server to an image forming apparatus corresponding to the destination phone number.

2. The cloud print method of claim 1, wherein the transmitting of the selected document to the image forming apparatus comprises:
   identifying the image forming apparatus that is registered in the cloud print server and that corresponds to the destination phone number when the transmission is permitted; and
   transmitting the selected document to the identified image forming apparatus.

3. The cloud print method of claim 2, wherein: the automatic response system receives a personal identification number (PIN) from the user terminal and transmits the received PIN together with the selected document and destination phone number to the cloud print server, and
   wherein the determining if transmission of the selected document to the destination phone number is permitted further comprises determining if the PIN received from the user terminal is consistent with a PIN stored in the cloud print server.

4. The cloud print method of claim 1, wherein, when a request is received from the user terminal, the corresponding phone number of the automatic response system is registered to the transmission permission list.

5. The cloud print method of claim 1, wherein the transmitting of the selected document to the image forming apparatus comprises:
   by the cloud print server:
   storing the transmitted document which is associated with the destination phone number;
   receiving from the user terminal, a request for printing the stored document corresponding to the destination phone number; and
   transmitting the stored document to the image forming apparatus corresponding to the destination phone number.

6. The cloud print method of claim 1, wherein the identifying of the destination phone number is performed by determining a phone number of the user terminal as the destination phone number.

7. The cloud print method of claim 1, wherein the identifying of the destination phone number comprises:
   transmitting a request for inputting the destination phone number to the user terminal; and
   receiving the destination phone number input to the user terminal.

8. At least one non-transitory computer readable medium storing computer readable instructions which when executed control at least one processor to implement a method of claim 1.

9. The cloud print method of claim 1, wherein the selected document received by the cloud print server is rendered by the cloud print server and the rendered selected document is transmitted to the image forming apparatus.

10. A system for performing a cloud print method, the system comprising:
- a cloud print server in which an image forming apparatus corresponding to at least one phone number is registered; and
- an automatic response system including at least one server and having a corresponding phone number, the automatic response system configured to provide a voice guidance message regarding a plurality of documents when a call from a user terminal is received, and configured to transmit, to the cloud print server, both a document selected from the plurality of documents by using the user terminal and a destination phone number,
- wherein the cloud print server is configured to transmit the selected document to the image forming apparatus corresponding to the destination phone number received from the automatic response system; and
- wherein the cloud print server comprises:
- a storage device;
- a communication device configured to transmit/receive data to/from the automatic response system and the image forming apparatus; and
- a transmission determination device configured to determine if transmission of the document received from the automatic response system is permitted,
- wherein the transmission permission device is configured to identify the corresponding phone number of the automatic response system and to determine that the transmission of the document received from the automatic response system is permitted if the identified corresponding phone number is included in a transmission permission list stored in the storage device; and
- wherein if it is determined that the transmission of the document received from the automatic response system is permitted, the cloud print server transmits the selected document to the image forming apparatus corresponding to the destination phone number.

11. The system of claim 10, wherein the cloud print server comprises:
- a controller; and
- a rendering device configured to perform rendering regarding the received document;
- wherein the storage device, in which the image forming apparatus corresponding to the destination phone number is registered, is coupled to the controller, and
- wherein, when the transmission of the received document is permitted after the determination is made by the transmission determination device, the controller is configured to check the storage device to identify the image forming apparatus corresponding to the destination phone number and to transmit the received document to the identified image forming apparatus through the communication device.

12. The system of claim 11, wherein:
- the automatic response system is further configured to receive a PIN input by the user terminal and transmit, to the cloud print server, the input PIN together with the selected document and the destination phone number, and
- the transmission determination device is configured to determine that the transmission is permitted if the PIN input by the user terminal is consistent with a PIN stored in the storage device.

13. The system of claim 10, wherein, when a request is received from the user terminal, the corresponding phone number of the automatic response system is registered to the transmission permission list.

14. The system of claim 10, wherein the cloud print server is further configured to store the received document to correspond to the destination phone number and transmit the document stored in the image forming apparatus corresponding to the destination phone number when a request for printing a document corresponding to the destination phone number is received from the user terminal.

15. The system of claim 10, wherein the automatic response system comprises:
- an exchanger configured to connect the call from the user terminal to a component included in the automatic response system;
- an interactive voice response (IVR) server configured to provide the voice guidance message regarding the document and receive an input for selecting the document from the user terminal when the call is connected to the user terminal via the exchanger;
- a destination identification device configured to identify the destination phone number to which the selected document is to be transmitted; and
- a cloud interworking server configured to transmit the selected document and the identified destination phone number to the cloud print server.

16. The system of claim 15, wherein the destination identification device is configured to determine the phone number of the user terminal as the destination phone number.

17. The system of claim 15, wherein the destination identification device is configured to transmit a request for inputting the destination phone number to the user terminal and receive the destination phone number input by the user terminal.

18. The system of claim 10, wherein the selected document received by the cloud print server is rendered by the cloud print server and the rendered selected document is transmitted to the image forming apparatus.

19. A system for performing a cloud print method, the system comprising:
- a cloud print server configured to transmit a selected document to an image forming apparatus corresponding to a destination phone number; and
- an automatic response system having a corresponding phone number, the automatic response system configured to receive a call from a user terminal, configured to provide a voice guidance message regarding a plurality of documents after the received call, and configured to transmit, to the cloud print server, both the document selected from the user terminal from the plurality of documents and the destination phone number,
- wherein the cloud printer server is configured to determine if transmission of the document received from the automatic response system is permitted, and
- wherein the cloud printer server is configured to identify the corresponding phone number of the automatic response system and configured to determine that the transmission of the document received from the automatic response system is permitted if the identified corresponding phone number is included in a transmission permission list stored in the storage device
- wherein if it is determined that the transmission of the document received from the automatic response system is permitted, the cloud print server transmits the selected document to the image forming apparatus corresponding to the destination phone number.

* * * * *